(12) United States Patent
Widger et al.

(10) Patent No.: US 12,347,397 B2
(45) Date of Patent: Jul. 1, 2025

(54) METHOD OF FORMING AN ELECTRO-OPTIC MEDIUM

(71) Applicant: E INK CORPORATION, Billerica, MA (US)

(72) Inventors: Peter Carsten Bailey Widger, Nashua, NH (US); Jay William Anseth, Canton, MA (US); Richard J. Paolini, Jr., Framingham, MA (US); Mark Benjamin Romanowsky, Cambridge, MA (US); Jillian Smith, Dorchester, MA (US); Stephen J. Telfer, Arlington, MA (US); Craig Alan Breen, Arlington, MA (US); Stephen Bull, Windham, NH (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/223,647

(22) Filed: Jul. 19, 2023

(65) Prior Publication Data

US 2023/0360614 A1    Nov. 9, 2023

Related U.S. Application Data

(60) Continuation of application No. 17/023,687, filed on Sep. 17, 2020, now Pat. No. 11,749,218, which is a
(Continued)

(51) Int. Cl.
*G02B 26/00*  (2006.01)
*C09B 67/08*  (2006.01)
(Continued)

(52) U.S. Cl.
CPC ......... *G09G 3/344* (2013.01); *C09B 67/0013* (2013.01); *G02F 1/167* (2013.01);
(Continued)

(58) Field of Classification Search
CPC ..... B82Y 30/00; C09B 67/0013; G02F 1/167; G02F 1/1675; G02F 1/16757;
(Continued)

(56) References Cited

U.S. PATENT DOCUMENTS 4,418,346 A    11/1983   Batchelder
5,115,346 A     5/1992   Lynam
(Continued)

FOREIGN PATENT DOCUMENTS

CN    102649880 A    8/2012
CN    102681280 A    9/2012
(Continued)

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Mahidere S Sahle
(74) *Attorney, Agent, or Firm* — Rajesh Vallabh

(57) ABSTRACT

A variable transmission film may include an electrophoretic medium having a plurality of capsules and a binder, each capsule containing a plurality of electrically charged particles and a fluid, the charged particles being movable by application of an electric field and being capable of being switched between an open state and a closed state. The film may include at least one of a binder containing fish gelatin and a polyanion; a binder containing one or more tinting agents; capsules containing charge control agents, such as an oligoamine-terminated polyolefin and a branched chain fatty acid comprising at least 8 carbon atoms; a selection of capsules in which at least 60% have a diameter between 50 µm and 90 µm and at least 15% have a diameter between 20
(Continued)

Open State

μm and 49 μm; a tinted adhesive layer; and a fluid selected from one or more nonconjugated olefinic hydrocarbons.

12 Claims, 30 Drawing Sheets

Related U.S. Application Data division of application No. 16/008,180, filed on Jun. 14, 2018, now Pat. No. 10,809,590.

(60) Provisional application No. 62/673,743, filed on May 18, 2018, provisional application No. 62/563,137, filed on Sep. 26, 2017, provisional application No. 62/520,629, filed on Jun. 16, 2017, provisional application No. 62/520,699, filed on Jun. 16, 2017, provisional application No. 62/520,731, filed on Jun. 16, 2017, provisional application No. 62/520,600, filed on Jun. 16, 2017.

(51) Int. Cl.
    *G02F 1/167*       (2019.01)
    *G02F 1/1675*     (2019.01)
    *G02F 1/16757*    (2019.01)
    *G02F 1/1676*     (2019.01)
    *G02F 1/1677*     (2019.01)
    *G09G 3/34*       (2006.01)
    *B82Y 30/00*     (2011.01)

(52) U.S. Cl.
    CPC ........ *G02F 1/1675* (2019.01); *G02F 1/16757* (2019.01); *G02F 1/1676* (2019.01); *G02F 1/1677* (2019.01); *B82Y 30/00* (2013.01); *G02F 2001/1678* (2013.01); *G02F 2202/022* (2013.01); *G02F 2202/28* (2013.01); *G09G 2320/0233* (2013.01)

(58) Field of Classification Search
    CPC ................. G02F 1/1676; G02F 1/1677; G02F 2001/1678; G02F 2202/022; G02F 2202/28; G09G 3/344; G09G 2320/0233
    USPC ........................................................ 359/296
    See application file for complete search history.

(56) References Cited

U.S. PATENT DOCUMENTS

| | | |
|---|---|---|
| 5,380,362 A | 1/1995 | Schubert |
| 5,872,552 A | 2/1999 | Gordon, II et al. |
| 5,930,026 A | 7/1999 | Jacobson |
| 5,961,804 A | 10/1999 | Jacobson |
| 6,017,584 A | 1/2000 | Albert et al. |
| 6,067,185 A | 5/2000 | Albert et al. |
| 6,120,588 A | 9/2000 | Jacobson |
| 6,120,839 A | 9/2000 | Comiskey et al. |
| 6,130,774 A | 10/2000 | Albert et al. |
| 6,144,361 A | 11/2000 | Gordon, II |
| 6,184,856 B1 | 2/2001 | Gordon, II |
| 6,225,971 B1 | 5/2001 | Gordon, II |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,271,823 B1 | 8/2001 | Gordon, II |
| 6,300,932 B1 | 10/2001 | Albert |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,623,662 B2 | 9/2003 | Wang et al. |
| 6,693,620 B1 | 2/2004 | Herb et al. |
| 6,721,083 B2 | 4/2004 | Jacobson et al. |
| 6,721,084 B2 | 4/2004 | Kawai |
| 6,727,881 B1 | 4/2004 | Albert et al. |
| 6,822,782 B2 | 11/2004 | Honeyman et al. |
| 6,831,771 B2 | 12/2004 | Ho et al. |
| 6,839,158 B2 | 1/2005 | Albert et al. |
| 6,866,760 B2 | 3/2005 | Paolini, Jr. et al. |
| 6,870,661 B2 | 3/2005 | Pullen et al. |
| 6,914,713 B2 | 7/2005 | Chung et al. |
| 6,922,276 B2 | 7/2005 | Zhang et al. |
| 6,927,892 B2 | 8/2005 | Ho et al. |
| 6,950,220 B2 | 9/2005 | Abramson et al. |
| 6,956,690 B2 | 10/2005 | Yu et al. |
| 6,958,848 B2 | 10/2005 | Cao et al. |
| 6,958,849 B2 | 10/2005 | Chen et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,038,655 B2 | 5/2006 | Herb et al. |
| 7,052,766 B2 | 5/2006 | Zang et al. |
| 7,072,095 B2 | 7/2006 | Liang et al. |
| 7,075,502 B1 | 7/2006 | Drzaic et al. |
| 7,110,162 B2 | 9/2006 | Wu et al. |
| 7,110,164 B2 | 9/2006 | Paolini, Jr. et al. |
| 7,113,323 B2 | 9/2006 | Ho et al. |
| 7,116,318 B2 | 10/2006 | Amundson et al. |
| 7,141,688 B2 | 11/2006 | Feng et al. |
| 7,142,351 B2 | 11/2006 | Chung et al. |
| 7,144,942 B2 | 12/2006 | Zang et al. |
| 7,170,670 B2 | 1/2007 | Webber |
| 7,184,197 B2 | 2/2007 | Liang et al. |
| 7,202,991 B2 | 4/2007 | Zhang et al. |
| 7,224,511 B2 | 5/2007 | Takagi |
| 7,226,550 B2 | 6/2007 | Hou et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,256,766 B2 | 8/2007 | Albert et al. |
| 7,277,218 B2 | 10/2007 | Hwang et al. |
| 7,286,279 B2 | 10/2007 | Yu et al. |
| 7,304,634 B2 | 12/2007 | Albert et al. |
| 7,307,779 B1 | 12/2007 | Cernasov |
| 7,312,784 B2 | 12/2007 | Baucom et al. |
| 7,312,916 B2 | 12/2007 | Pullen et al. |
| 7,321,459 B2 | 1/2008 | Masuda |
| 7,327,511 B2 | 2/2008 | Whitesides et al. |
| 7,339,715 B2 | 3/2008 | Webber et al. |
| 7,382,514 B2 | 6/2008 | Hsu et al. |
| 7,390,901 B2 | 6/2008 | Yang et al. |
| 7,405,865 B2 | 7/2008 | Ogiwara |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,473,782 B2 | 1/2009 | Yang et al. |
| 7,477,444 B2 | 1/2009 | Cao et al. |
| 7,507,449 B2 | 3/2009 | Chari et al. |
| 7,535,624 B2 | 5/2009 | Amundson et al. |
| 7,560,004 B2 | 7/2009 | Pereira et al. |
| 7,561,324 B2 | 7/2009 | Duthaler et al. |
| 7,572,394 B2 | 8/2009 | Gu et al. |
| 7,576,904 B2 | 8/2009 | Chung et al. |
| 7,580,180 B2 | 8/2009 | Ho et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 7,910,175 B2 | 3/2011 | Webber |
| 7,952,790 B2 | 5/2011 | Honeyman et al. |
| 7,999,787 B2 | 8/2011 | Amundson et al. |
| 8,009,348 B2 | 8/2011 | Zehner et al. |
| 8,018,640 B2 | 9/2011 | Whitesides et al. |
| 8,035,886 B2 | 10/2011 | Jacobson |

(56) References Cited

U.S. PATENT DOCUMENTS

| | | | |
|---|---|---|---|
| 8,115,729 B2 | 2/2012 | Danner et al. | |
| 8,119,802 B2 | 2/2012 | Moonen et al. | |
| 8,129,655 B2 | 3/2012 | Jacobson et al. | |
| 8,257,614 B2 | 9/2012 | Gu et al. | |
| 8,270,064 B2 | 9/2012 | Feick et al. | |
| 8,305,341 B2 | 11/2012 | Arango et al. | |
| 8,319,759 B2 | 11/2012 | Jacobson et al. | |
| 8,363,306 B2 | 1/2013 | Du et al. | |
| 8,390,918 B2 | 3/2013 | Wilcox et al. | |
| 8,446,664 B2 | 5/2013 | Chen et al. | |
| 8,540,359 B2 | 9/2013 | Zhou et al. | |
| 8,582,196 B2 | 11/2013 | Walls et al. | |
| 8,654,436 B1 | 2/2014 | Feick | |
| 8,670,174 B2 | 3/2014 | Sprague et al. | |
| 8,902,491 B2 | 12/2014 | Wang et al. | |
| 8,961,831 B2 | 2/2015 | Du et al. | |
| 9,052,564 B2 | 6/2015 | Sprague et al. | |
| 9,114,663 B2 | 8/2015 | Ho et al. | |
| 9,279,906 B2 | 3/2016 | Kang | |
| 9,341,915 B2 | 5/2016 | Yang et al. | |
| 9,348,193 B2 | 5/2016 | Hiji et al. | |
| 9,361,836 B1 | 6/2016 | Telfer et al. | |
| 9,366,935 B2 | 6/2016 | Du et al. | |
| 9,372,380 B2 | 6/2016 | Du et al. | |
| 9,382,427 B2 | 7/2016 | Du et al. | |
| 9,423,666 B2 | 8/2016 | Wang et al. | |
| 9,428,649 B2 | 8/2016 | Li et al. | |
| 9,557,623 B2 | 1/2017 | Wang et al. | |
| 9,645,467 B2 | 5/2017 | Yokokawa et al. | |
| 9,658,373 B2 | 5/2017 | Downing | |
| 9,670,367 B2 | 6/2017 | Li et al. | |
| 9,688,859 B2 | 6/2017 | Yezek et al. | |
| 9,726,957 B2 | 8/2017 | Telfer et al. | |
| 9,777,201 B2 | 10/2017 | Widger et al. | |
| 9,778,537 B2 | 10/2017 | Wang et al. | |
| 9,835,926 B2 | 12/2017 | Sprague et al. | |
| 9,921,451 B2 | 3/2018 | Telfer et al. | |
| 10,151,955 B2 | 12/2018 | Paolini, Jr. et al. | |
| 10,324,353 B2 | 6/2019 | O'Keeffe | |
| 10,372,008 B2 | 8/2019 | Telfer et al. | |
| 10,761,395 B2 | 9/2020 | Du et al. | |
| 11,098,206 B2 | 8/2021 | Wu et al. | |
| 2002/0180687 A1* | 12/2002 | Webber | G09G 3/344 345/107 |
| 2003/0048522 A1 | 3/2003 | Liang et al. | |
| 2003/0151029 A1 | 8/2003 | Hsu et al. | |
| 2003/0164480 A1 | 9/2003 | Wu et al. | |
| 2004/0030125 A1 | 2/2004 | Li et al. | |
| 2005/0012980 A1 | 1/2005 | Wilcox et al. | |
| 2005/0156340 A1 | 7/2005 | Valianatos et al. | |
| 2007/0091417 A1 | 4/2007 | Cao et al. | |
| 2007/0109219 A1* | 5/2007 | Whitesides | G02F 1/167 345/55 |
| 2009/0009852 A1 | 1/2009 | Honeyman et al. | |
| 2009/0122389 A1 | 5/2009 | Whitesides et al. | |
| 2010/0148385 A1 | 6/2010 | Balko et al. | |
| 2011/0217639 A1 | 9/2011 | Sprague | |
| 2012/0049125 A1 | 3/2012 | Du et al. | |
| 2012/0118198 A1 | 5/2012 | Zhou et al. | |
| 2013/0063333 A1 | 3/2013 | Arango et al. | |
| 2013/0161565 A1 | 6/2013 | Laxton | |
| 2013/0193385 A1 | 8/2013 | Li et al. | |
| 2013/0244149 A1 | 9/2013 | Wang et al. | |
| 2014/0011913 A1 | 1/2014 | Du et al. | |
| 2014/0078024 A1 | 3/2014 | Paolini, Jr. et al. | |
| 2014/0078576 A1 | 3/2014 | Sprague | |
| 2014/0078857 A1 | 3/2014 | Nelson | |
| 2014/0104674 A1 | 4/2014 | Ting et al. | |
| 2014/0177028 A1* | 6/2014 | Shrivastava | E06B 3/6722 359/275 |
| 2014/0231728 A1 | 8/2014 | Du et al. | |
| 2014/0362131 A1* | 12/2014 | Paolini, Jr | G02F 1/167 345/697 |
| 2015/0050477 A1* | 2/2015 | Komatsuzaki | C09J 7/26 428/216 |
| 2015/0177590 A1 | 6/2015 | Laxton | |
| 2015/0185509 A1 | 7/2015 | Wang et al. | |
| 2015/0277205 A1 | 10/2015 | Kawahara et al. | |
| 2015/0301425 A1 | 10/2015 | Du et al. | |
| 2016/0170106 A1 | 6/2016 | Wang et al. | |

FOREIGN PATENT DOCUMENTS

| | | |
|---|---|---|
| JP | 2003222913 A | 8/2003 |
| JP | 2004163818 A | 6/2004 |
| KR | 20130078094 A | 7/2013 |
| KR | 20160052092 A | 5/2016 |
| WO | 1999010767 A1 | 3/1999 |

OTHER PUBLICATIONS

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2018/037479, Jan. 11, 2019.

European Patent Office, "Extended European Search Report", EP Appl. No 18817884.2, Feb. 18, 2021.

European Patent Office, "Extended European Search Report", EP Appl. No. 22175237.1, Dec. 19, 2022.

* cited by examiner

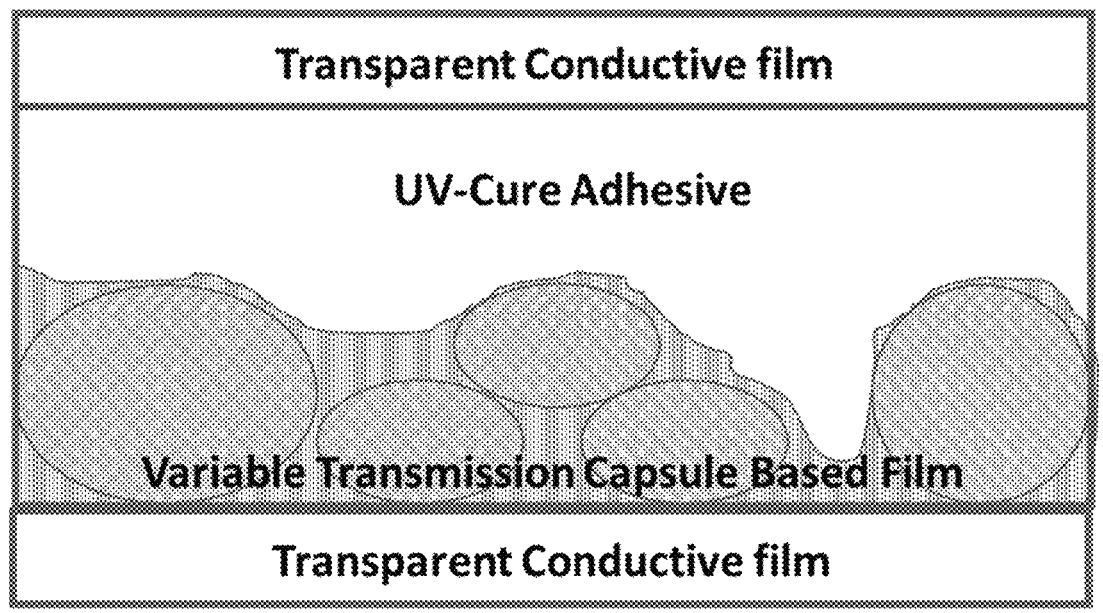
Fig. 21
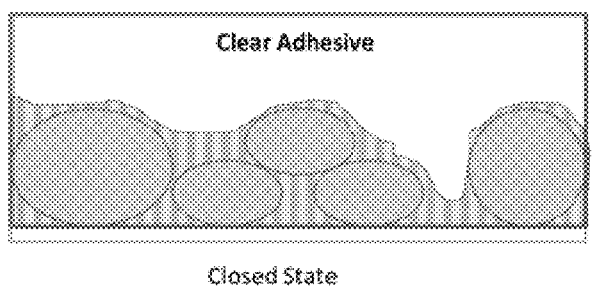 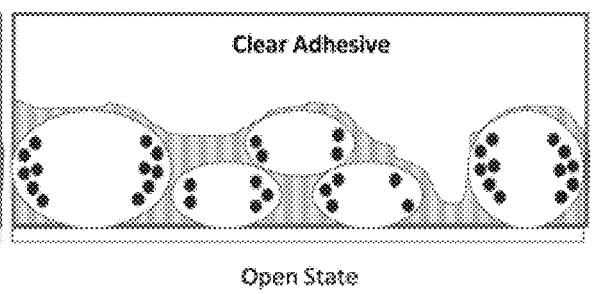
Fig. 22A  Fig. 22B
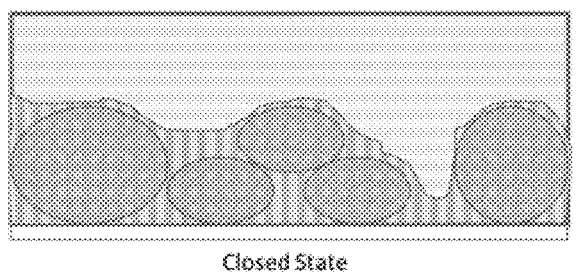 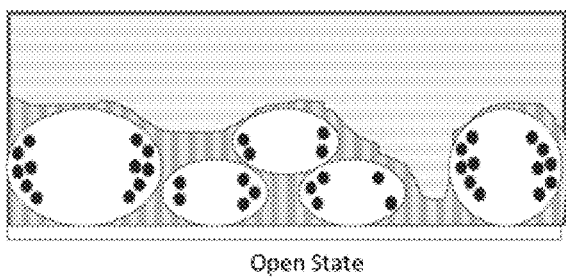
Fig. 23A  Fig. 23B

METHOD OF FORMING AN ELECTRO-OPTIC MEDIUM

CROSS-REFERENCE TO RELATED APPLICATIONS

This application is a continuation of U.S. patent application Ser. No. 17/023,687 (filed on Sep. 17, 2020), which is a divisional application of U.S. patent application Ser. No. 16/008,180 (filed Jun. 14, 2018), which claims priority from U.S. Provisional Patent Application No. 62/520,629 (filed on Jun. 16, 2017), U.S. Provisional Patent Application No. 62/520,600 (filed on Jun. 16, 2017), U.S. Provisional Patent Application No. 62/520,731 (filed on Jun. 16, 2017), U.S. Provisional Patent Application No. 62/520,699 (filed on Jun. 16, 2017), U.S. Provisional Patent Application No. 62/563,137 (filed on Sep. 26, 2017), and U.S. Provisional Patent Application No. 62/673,743 (filed on May 18, 2018), all of which applications are hereby incorporated by reference. This application is also related to U.S. Pat. Nos. 7,256,766; 7,327,511; 7,679,814; and 7,999,787.

The entire contents of these applications, patents, and of all other U.S. patents and published and copending applications mentioned below, are herein incorporated by reference in their entireties.

BACKGROUND OF INVENTION

This invention relates to variable transmission devices. More specifically, this invention relates to variable transmission devices containing electrophoretic media comprising a plurality of capsules in a binder and adhesive layers that may improve the optical performance of the variable transmission device.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

U.S. Pat. No. 7,327,511 describes variable transmission devices including charged pigment particles that are distributed in a non-polar solvent and encapsulated. These variable transmission devices can be driven to an open state with an AC driving voltage whereby the charged pigment particles are driven to the capsule walls. Accordingly, such variable transmission devices are useful for viewing surfaces where it is desirable to alter the transmissivity at will, such as privacy glass, sunroofs, and windows on buildings.

U.S. Pat. No. 7,327,511 also describes various factors which are important in adapting electrophoretic media for optimum performance in light modulators. One important factor is minimization of haze. In this application, "haze" refers to the percentage of diffuse transmitted light (light that is scattered as it is transmitted), compared to total transmitted light. When designing light modulators that can be electrically switched from an open, clear state to a closed opaque state, it is desirable that the open state have a haze of less than 10 percent, more preferably less than 2 percent. Another important factor is contrast. An additional concern for a variable transmission devices comprising capsules is grain. In this application "grain" refers to visual non-uniformities caused by several factors, such as clusters of colored binder or clumps/layers of capsules, capsule packing variability, voids, thickness variations, and coating defects including pinholes. These non-uniformities reduce visibility when a user looks through the device in the open state. The term "grain" originates in film photography, where early silver films were known to have clumps of silver that made a developed picture appear "grainy." Efforts to reduce grain in variable transmission devices typically focus on decreasing the variation in capsule packing density.

One method for reducing the amount of grain in an encapsulated electrophoretic medium is to use more capsules that are smaller in size, e.g., between 20 and 50 μm in diameter. This small size allows for closer packing of capsules, and due to the microscopic size of the capsules, individual capsules are unlikely to be discerned. As a result, a user looking through the device will see less grain. However, it has been observed that variable transmission devices comprising a monolayer of "small" capsules, i.e., in the range of 20 and 50 μm in diameter have less contrast between the open and closed states because the electro-optic layer is thinner. That is, there is less pigment interfering with transmission through the layer and therefore the closed state transmission is higher. Additionally, the presence of many similar-sized capsules in a close-packed monolayer results in "haloing" or "starbursts" due to interference when viewing light sources through the variable transmission device. These interference patterns can be very distracting to a viewer, and diminish the viewing experience in the open state.

Another shortcoming of the variable transmission devices described in U.S. Pat. No. 7,327,511 is "kickback," or the self-erasing of an optical display state due to impedance mismatches between the electrophoretic internal phase and the binder surrounding the electrophoretic internal phase. The impedance mismatch can allow zones of charge to build up between the various materials and influence the position of the electrophoretic particles in the internal phase, resulting in optical-state decay. Obviously, self-erasing is highly undesirable in that it reverses (or otherwise distorts, in the case of a grayscale display) the desired optical state of the display, or allows a transmissive device to fade from open to closed. It has been found that self-erasing is a particular problem in polymer-dispersed electrophoretic media and displays, where the capsule is essentially removed from the electro-optic media, leaving only bubbles of internal phase in a polymer binder.

Efforts to reduce the impedance mismatch between the electrophoretic internal phase and the binder have introduced new challenges. For example, binder formulations that are resistively matched with an electrophoretic internal phase (and encapsulation layers if present) may have an off-putting color, or introduce "haze." In such instances, when the variable transmission film is in its highest transmission (i.e., "open") state, a viewer perceives the film as having a "tint" and/or "speckle," which detracts from the viewing. While the tint and speckle are annoying for most applications, they can present safety issues when used for automobile or aircraft glass.

Thus, there is a need for improved electro-optic media that may be incorporated in variable transmission devices.

SUMMARY OF INVENTION

In one aspect, this invention provides a variable transmission electrophoretic medium comprising a plurality of capsules in a binder, each capsule having an internal phase comprising a plurality of electrically charged particles in a fluid, the charged particles being movable by application of an electric field between an open state, in which the capsules have a low absorbance of light passing through the medium and a closed state in which the capsules have a higher absorbance of light passing through the medium, and wherein the binder has an absorbance of from 0.5 to 2.0 times the absorbance of the capsules in the closed state. For example, the absorbance of the binder may be from 0.75 to 1.25, or from 0.9 to 1.1 times the absorbance of the capsules in the closed state. Since the binders used are normally polymeric and essentially transparent, at least in the thicknesses of the order of 50 μm normally used in electrophoretic media, to produce the necessary absorbance in the binder, it will normally be necessary to color the binder using a dye or a pigment, and when the variable transmission medium is to be used in a location which is subject to substantial ultraviolet radiation (as in a variable transmission vehicle sunroof or window, or a house window) the latter is generally preferred since dyes are prone to long term fading when exposed to ultraviolet radiation. One preferred pigment for this purpose is carbon black, which should have a very small particle size (less than 100 nm primary aggregate) to minimize undesirable light scattering. In other embodiment, the color may be achieved with a plurality of pigments, such as a combination of cyan, yellow, and magenta pigment, which may provide a medium with relatively low haze.

For reasons discussed below, it is desirable that the proportion of binder in the electrophoretic medium be higher than in most prior art encapsulated electrophoretic media; there should be at least 1 part by weight of binder for each 15 parts by weight of capsules and optionally up to 1 part by weight of binder for each 4 parts by weight of capsules.

In another aspect, this invention provides an electrophoretic medium comprising a plurality of electrically charged particles, a liquid in which the particles are dispersed and a charge control agent ("CCA"), the charge control agent comprising an oligoamine-terminated polyolefin and a branched chain fatty acid comprising at least about 8 carbon atoms.

The polyolefin used as part of the charge control agent in the electrophoretic medium of the present invention may be an oligoamine-terminated polyisobutylene. Such copolymers are available commercially as OLOA® 11000 (manufactured by Chevron Oronite Company LLC of San Ramon, CA). The branched chain fatty acid used is desirably a 2-alkyl fatty acid, which may contain 12 or more carbon atoms, a specific preferred acid being 2-hexyldecanoic acid ("2-HDA"). The fatty acid used should be one which is easily soluble in the liquid used to disperse the particles and is resistant to crystallization.

In another aspect, the invention provides an electro-optic medium comprising a plurality of capsules in a binder that comprises a mixture of fish gelatin and a polyanion. The capsules are typically formed from a coacervate of gelatin and acacia and they encapsulate an internal phase comprising a mixture of a non-polar solvent and charged pigment particles. Gelatin formulations according to various embodiments of the present invention, in particular fish gelatin and acacia mixtures, are suitable as binders for encapsulated electro-optic media. Moreover, when used in conjunction with pig gelatin/acacia coacervates to encapsulate internal phases, these gelatin binders provide excellent index-matching, and thus low haze, e.g., when incorporated into transmissive devices. Additionally, electro-optic media incorporating a mixture of fish gelatin and polyanion as a binder do not suffer from the kickback that is observed in gelatin-only binder compositions.

In some embodiments, the binder comprises a weight ratio of fish gelatin to polyanion of 0.5 to 2.0 or more preferably, about equal parts by weight of fish gelatin and polyanion. In some embodiments, the capsules additionally encapsulate second charged pigment particles. The second charged pigment particles may be oppositely charged and a different color than the first charged pigment particles. In some embodiments, the binder additionally comprises a pigment or dye. The mixture of a non-polar solvent and first charged pigment particles may additionally comprise a charge control agent, while the non-polar solvent may be a mixture of hydrocarbons or limonene, e.g., 1-limonene. Binders of the invention may have an index of refraction between 1.47 and 1.57 at 550 nm and 50% relative humidity (RH).

In another aspect, an electro-optic medium is provided that includes a plurality of capsules in a polymeric binder, each capsule encapsulating charged pigment particles in a non-polar solvent, wherein the plurality of capsules comprise at least 60% in a size range of between 50 μm and 90 μm in diameter, at least 15% in a size range of between 20 μm and 49 μm in diameter. In another aspect, an electro-optic medium is provided that includes a plurality of capsules and a binder, each capsule encapsulating charged pigment particles in a non-polar solvent, wherein the plurality of capsules comprise at least 90% in a size range between 5 μm and 50 μm in diameter, and the plurality of capsules have a mean number diameter of 20 μm to 30 μm. In another aspect, an electro-optic medium is provided that includes a plurality of capsules and a binder, each capsule encapsulating charged pigment particles in a non-polar solvent, wherein the plurality of capsules comprise less than 90% in a size range between 5 μm and 50 μm in diameter, and the plurality of capsules have a mean number diameter of 25 μm to 35 μm.

In another aspect, a method of forming an electro-optic medium may include providing an internal phase mixture of a non-polar solvent and charged pigment particles, encapsulating portions of the internal phase mixture in a plurality of capsules, sieving the plurality of capsules by size to isolate at least two size distributions, a first size distribution being between 50 μm and 90 μm in diameter, and a second portion being between 20 μm and 49, and mixing from two to five parts by weight of the first size distribution to one part by weight of the second size distribution along with a polymeric binder.

In another aspect, a binder formulation for variable transmission films is provided that may include a blend of colored particles to achieve a variable transmission film that has no color (i.e., neutral density film). In general, a variable transmission film of the invention includes a first light-transmissive electrode and a second light-transmissive electrode with an electrophoretic layer and a polyurethane acrylate based adhesive disposed between the first and second light-transmissive electrodes. The electrophoretic layer may include an encapsulated internal phase comprising charged pigments in a non-polar liquid and a binder comprising a blend of colored particles. The blend of colored particles comprises black, cyan, and magenta particles. In most embodiments, the average diameter of the particles in the blend of colored particles is between 20 and 100 nm. In some embodiments, the ratio of black to cyan particles may be 10:1 to 3:2 (black:cyan). In some embodiments, the ratio of black to magenta particles may be 10:1 to 3:2 (black:magenta). In some embodiments, the blend of colored particles may be 0.1% and 3% (wt. of binder).

In another aspect, this invention provides a variable transmission electrophoretic medium comprising a plurality of capsules in a binder, each capsule having an internal phase comprising a plurality of electrically charged particles in a fluid, the charged particles being movable by application of an electric field between an open state and a closed state, wherein the fluid comprises one or more nonconjugated olefinic hydrocarbons.

In another aspect, this invention provides a variable transmission electrophoretic device comprising a layer of the aforementioned variable transmission electrophoretic medium disposed between two light-transmissive electrodes. Such a variable transmission electrophoretic device may further comprise at least one light-transmissive substrate on the opposed side of one of the light-transmissive electrodes from the electrophoretic medium; obviously, such a substrate may be provided for each of the light-transmissive electrodes. The electro-optic media according to various embodiments of the invention may also be incorporated into other varieties of electro-optic devices. For example, a front plane laminate (FPL) may include a light-transmissive electrode layer, an adhesive layer, and the electro-optic medium of the invention. In some embodiments, the front plane laminate will also include a release sheet or an adhesive layer or both. The electro-optic media of the invention can also be incorporated into an electro-optic display including a light-transmissive electrode layer, an adhesive layer, the electro-optic media of the invention, and an array of pixel electrodes.

These and other aspects of the present invention will be apparent in view of the following description.

BRIEF DESCRIPTION OF DRAWINGS

The drawing Figures depict one or more implementations in accord with the present concepts, by way of example only, not by way of limitations. In the figures, like reference numerals refer to the same or similar elements.

FIG. 17 demonstrates that there is little variation in grain between the two different capsule size distributions.

As shown in FIG. 18, a combination of 3 parts cyan to 3 parts magenta to 14 parts black produces a relatively even visible light absorption spectra.

FIG. 21 is a cross-sectional side view of a variable transmission film having a clear adhesive layer.

FIGS. 22A and 22B are cross-sectional side views of an electrophoretic medium in combination with a clear adhesive in the closed and open states, respectively.

FIGS. 23A and 23B are cross-sectional side views of an electrophoretic medium in combination with a tinted adhesive in the closed and open states, respectively.

DETAILED DESCRIPTION

Figure 12A:
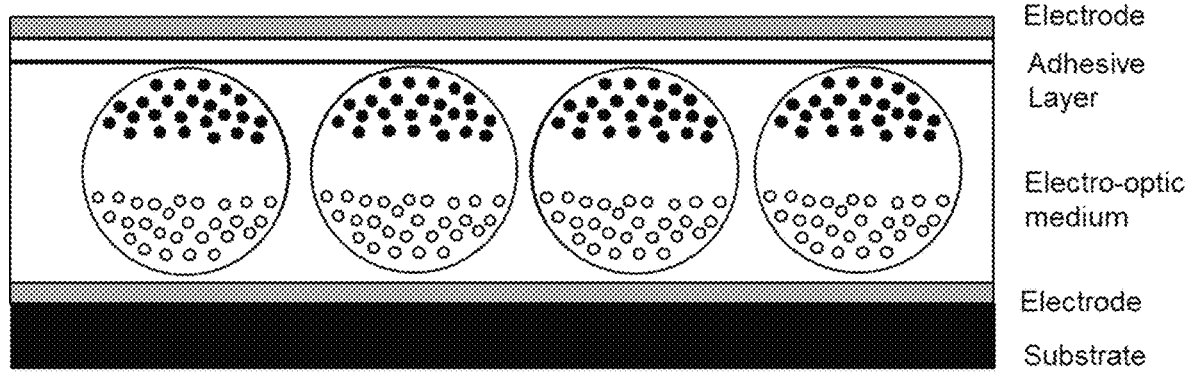
FIG. 12A is an illustration of an electro-optic display including two types of charged particles. The particles can be moved toward (away) from a viewer with the application of an electric field.

Electrophoretic displays (such as an eReader) are typically opaque and operate in a reflective mode. This functionality is illustrated in FIG. 12A, where the reflectivity of light striking a surface is modulated by moving black or white charged particles toward a viewing surface with a suitable voltage. However, electrophoretic devices can also be made to operate in a so-called "shutter mode," illustrated in FIG. 12B, wherein one operating state is substantially opaque and another operating state is light transmissive. When this "shutter mode" electrophoretic device is constructed on a transparent substrate, it is possible to regulate transmission of light through the device. One potential use for shutter mode electrophoretic media is windows with variable light transmission.

Figure 12B:
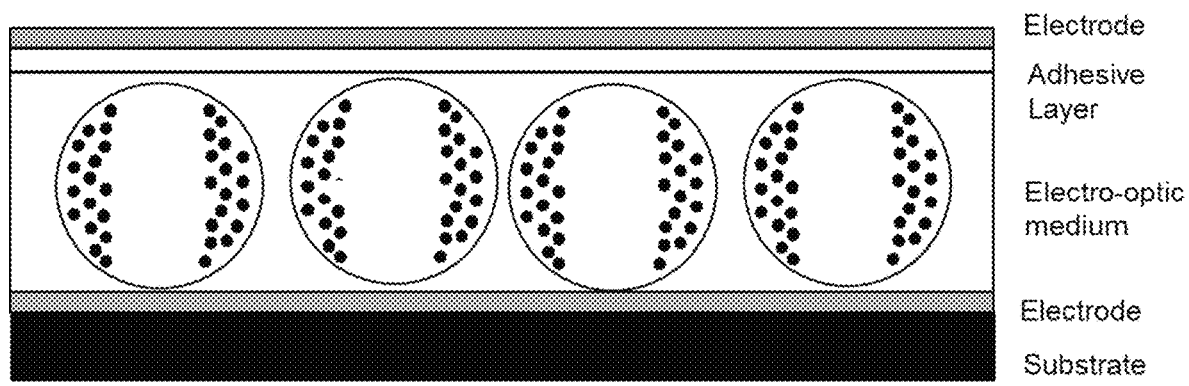
FIG. 12B is an illustration of a variable transmission device including first and second light-transmissive electrode layers with an electro-optic medium disposed between the layers. The particles can be moved adjacent to the capsule walls with the application of an electric field, thereby allowing light to pass through the medium.

The devices of FIGS. 12A and 12B include electro-optic media that consists of capsules in a polymeric binder. The capsules contain charged pigment particles that move in response to an electric field. The capsules are typically formed from gelatin materials described in greater detail below. The electro-optic medium is distributed between first and second electrode layers, which may be made from known materials such as indium-tin oxide (ITO) coated polyethylene terephthalate (PET). Alternatively, an electrode layer may comprise metal electrodes, which may be arranged as pixels. The pixels may be controllable as an active matrix, thereby allowing for the display of text and pictures. An additional adhesive layer is typically present between the electro-optic medium and one of the electrode layers. The adhesive layer may be UV curable, and typically improves the planarity of the final device by "filling in" deviations created by the capsules. Suitable adhesive formulations are described in U.S. 2017/0022403, which is incorporated by reference herein.

When a DC field is applied to the device of FIG. 12A, the dark or light particles move toward the viewing surface, thereby changing the optical state from dark to light. In FIG. 12B, when an alternating electric field is applied to one of the electrodes, the charged pigment particles are driven to the walls of the capsule, resulting in an aperture through the capsule for the transmission of light, i.e., an open state. In both embodiments, because the solvent is non-polar and comprises charge control agents and/or stabilizers, the optical state (black/white; open/closed) can be maintained for long periods of time (weeks) without the need to maintain the electric field. As a result, the devices may be "switched" only a couple of times a day and consume very little power.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" or "closed" and "open" may be used hereinafter to refer to the two extreme optical states of a display, and should be understood as normally including extreme optical states which are not strictly black and white, for example the aforementioned white and dark blue states.

The term "monochrome" may be used hereinafter to denote a drive scheme which only drives pixels to their two extreme optical states with no intervening gray states. (In the case of the shutter mode displays discussed below, the two extreme optical states may be referred to as "dark" and "clear" or "open" and "closed".)

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. And related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,119,802; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 2016/0139483; and 2016/0170106;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445; and (i) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. Nos. 6,866,760 and 7,079,305. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

Charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002, 728, 9,366,935, and 9,372,380 as well as US Publication No. 2014-0011913, the contents of all of which are incorporated herein by reference in their entireties.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA® 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly(ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The fluids used in the variable transmission media of the present invention will typically be of low dielectric constant (preferably less than 10 and desirably less than 3). The fluids are preferably solvents that have low viscosity, relatively high refractive index, low cost, low reactivity, and low vapor pressure/high boiling point. Examples of solvents include, but are not limited to, aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of the index matching agents. For example, the aforementioned U.S. Pat. No. 7,679,814 describes an electrophoretic medium suitable for use in a variable transmission device in which the fluid surrounding the electrophoretic particles comprises a mixture of a partially hydrogenated aromatic hydrocarbon and a terpene, a preferred mixture being d-limonene and a partially hydrogenated terphenyl, available commercially as Cargille® 5040 from Cargille-Sacher Laboratories, 55 Commerce Rd, Cedar Grove N.J. 07009. In the encapsulated media made according to various embodiments of the present invention, it is preferred that the refractive index of the encapsulated dispersion match as closely as possible to that of the encapsulating material to reduce haze. In most instances, it is beneficial to have an internal phase with an index of refraction between 1.51 and 1.57 at 550 nm, preferably about 1.54 at 550 nm.

In a preferred embodiment of the present invention, the encapsulated fluid may comprise one or more nonconjugated olefinic hydrocarbons, preferably cyclic hydrocarbons. Examples of nonconjugated olefinic hydrocarbons include, but are not limited to terpenes, such as limonene; phenyl cyclohexane; hexyl benzoate; cyclododecatriene; 1,5-dimethyl tetralin; partially hydrogenated terphenyl, such as Cargille® 5040; phenylmethylsiloxane oligomer; and combinations thereof. A most preferred composition for the encapsulated fluid according to an embodiment of the present invention comprises cyclododecatriene and a partially hydrogenated terphenyl.

It has previously been suggested that the best approach to a variable transmission electrophoretic medium would be a polymer-dispersed electrophoretic medium with a broad size distribution of droplets; such a broad size distribution should give low grain due to good uniformity of the layer of electrophoretic medium and the presence of very small droplets (usually known as "fines") which serve to fill in gaps between larger droplets. Previous attempts to use microcapsule media in variable transmission devices have suffered from excessive grain (local variations in optical density) and high minimum transmission values (i.e., a relatively leaky closed state) such that the media would not be useful in some commercial applications, such as vehicle sunroofs. However, polymer-dispersed electrophoretic media have their own problems, including unpredictable gelation of the continuous phase with parameters such as shear and temperature, which significantly complicates the medium production process, and the use of a skim coat to reduce the likelihood of droplet bursting. Capsules are more resistant to bursting than are the droplets in a polymer-dispersed medium, which allows capsule-based media to use certain coating techniques, such as spray coating, which are not available with polymer-dispersed media. Capsule-based media do not require a skim coat to prevent capsule bursting, and the capsules can be size separated by techniques such as sieving to produce media with a limited range of capsules sizes, in ways which are difficult or impossible with polymer-dispersed media.

However, as previously noted, capsule-based electrophoretic media tend to suffer from undesirably high light transmission in the closed state and/or excessive grain. For example, at low coating weights capsule-based media suffer from high light transmissions through pinholes or voids (gaps between adjacent capsules), while at higher coating weights excessive grain and poor contrast ratios become serious problems. Even if non-size-separated capsules are used, the capsule walls (especially those of small capsules) increase transmission in the closed state and decrease the contrast ratio possible in a capsule-based variable transmission device. Capsule-based media may also suffer from inadequate contrast ratios (ratios of maximum open transmission to minimum closed transmission) even at high operating voltages, for example 120 V. It has now been found that the aforementioned disadvantages of capsule-based variable transmission devices can be reduced, or even substantially eliminated by utilizing variable transmission electrophoretic media made according to the various embodiments of the present invention.

According to a first embodiment of the present invention, undesirably high light transmission and/or excessive grain may be reduced or substantially eliminated by providing variable transmission electrophoretic medium comprising a plurality of capsules and binder in which the absorbance of the binder (the continuous phase) is approximately equal to the absorbance of the internal phase within the capsules in the closed state. The binders used in capsule-based electrophoretic media are normally polymeric and essentially transparent, at least in the thicknesses of the order of 50 µm normally used in such media. To produce the necessary absorbance in the binder, color may be added to the binder using a dye or a pigment (collectively referred to as "tinting agents"). To minimize haze, either a dye or a very fine dispersed pigment should be used as the tinting agent. However, since variable transmission devices, such as windows and vehicle sunroofs are exposed for long periods to sunlight having a substantial proportion of near ultraviolet radiation, pigments are generally preferred as tinting agents because dyes are susceptible to photo or thermal bleaching. The presently preferred pigment is carbon black, which has a desirable neutral tone and excellent light stability. However, carbon black does have a strong tendency to aggregate (almost all commercial carbon blacks are aggregates of small particles) so it is necessary to add a dispersant or surfactant to the carbon black to maintain it at a particle size which does not scatter light excessively. Furthermore, it is essential to keep carbon black well dispersed in electrophoretic media because carbon black is highly electrically conductive and formation of aggregates or threads of particles could create electrical short circuits between the electrodes, or at least increase the conductivity of the binder to an undesirable extent. Finally, the concentration of carbon black in the binder must be kept low to prevent much of the electrical field between the electrodes passing through the binder and around the capsules, thus lowering the electro-optic performance of the capsules. Although low molecular weight surfactants can be used to assist the dispersion of carbon black, such surfactants have a tendency to migrate interfaces other than that between the carbon black and the surrounding phase, and such surfactant migration can give rise to various problems. Accordingly, the use of polymeric surfactants is preferred, for example poloxamer dispersants such as Kolliphor P188 (available from BASF) has been found to work well with the preferred carbon black sold commercially as Emperor 2000 carbon black by Cabot Corporation in a liquid gelatin such as Hipure liquid gelatin sold by Norland Products or a blend of liquid gelatin with acacia.

In a preferred embodiment of the present invention, the tinting agent may comprise a blend of colored particles. The blend of colored particles may comprise black, cyan, and magenta particles. In most embodiments, the average diameter of the particles in the blend of colored particles may be between 20 and 100 nm. In some embodiments, the ratio of black to cyan particles may be between 10:1 to 3:2 (black:cyan). In some embodiments, the ratio of black to magenta particles may be between 10:1 to 3:2 (black:magenta). In some embodiments, the blend of colored particles may be present at between 0.1% and 3% (wt. of binder). In some embodiments, the binder includes approximately 3 parts cyan to 3 parts magenta to 14 parts carbon black at about 2% total color mixture by weight of binder. This binder mixture has been found to be excellent for use when the internal phase in encapsulated in a coacervate of (pig) gelatin and acacia. The resulting electro-optic medium has low haze when used in transmissive devices as well as less kickback, and thus greater long-term state stability.

For reasons explained below with reference to the drawings, it is not desirable that the variable transmission media of the present invention incorporate thin layers of heavily tinted binder; best results are obtained with a relatively thicker layer of less heavily tinted binder. Indeed, it has been found desirable that the media of the present invention contain a higher proportion of binder than most prior art encapsulated electrophoretic media; there should be at least 1 part by weight of binder for each 15 parts by weight of capsules and optionally up to 1 parts by weight of binder for each 4 parts by weight of capsules. Such a relatively high proportion of binder minimizes transmission of light through pinholes and voids in the capsule layer. Furthermore, the coating weight used should be such that at least a monolayer of capsules, or somewhat more, is deposited on the substrate used for coating.

Figures 1A, 1B:
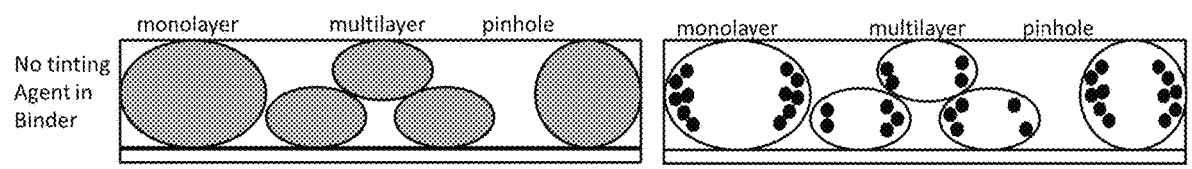
FIGS. 1A-1F of the accompanying drawings are schematic cross-sections through (i) a prior art variable transmission display with no coloring agent in the binder (FIGS. 1A and 1B, the former showing schematically the closed state and the latter the open state); (ii) a modification of the prior art display of FIGS. 1A and 1B using a highly colored very thin binder (FIGS. 1C and 1D); and (iii) a variable transmission display of the present invention having a relatively thick colored binder (FIGS. 1E and 1F).

FIGS. 1A and 1B are schematic cross-sections through the closed and open states respectively of a prior art capsule-based electrophoretic medium in which the binder is not colored. It will be seen that the transmission in the closed state of the medium is increased by the presence of pinholes (as shown) or voids, where there is essentially nothing to block transmission of light through the medium even in the closed state. The resultant "leakage" of light through the closed state of the medium greatly reduces its contrast ratio. In practice, the presence of such voids and pinholes are problematic even if the coating weight is increased from the standard 20 $g/m^2$ to about 24 $g/m^2$, because they limit the minimum transmission in the closed state to above 3 percent, which is too high for a vehicle sunroof.

Figures 1C, 1D:
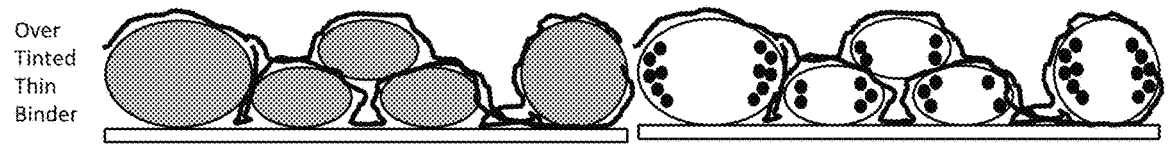

FIGS. 1C and 1D are schematic cross-sections, similar to those FIGS. 1A and 1B respectively, through a capsule-based electrophoretic medium which comprises a small amount of a heavily tinted binder. The presence of this tinted binder greatly reduces the effect of pinholes and voids in the closed state (FIG. 1C), thus improving the contrast ratio of the medium as compared with the medium of FIGS. 1A and 1B. However, in the open state (FIG. 1D) the heavily tinted binder results in an undesirably high grain because the heavily tinted binder tends to over emphasize the capsule walls in multilayer sections of the display cf. FIG. 1D.

Figures 1E, 1F:
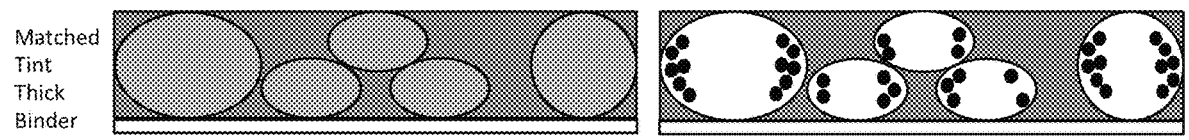

FIGS. 1E and 1F are schematic cross-sections, similar to those FIGS. 1A and 1B respectively, through a preferred capsule-based electrophoretic medium of the present invention which uses a binder which is less strongly tinted than the binder in FIGS. 1C and 1D but is present in a much larger amount so that the absorbance of the binder substantially matches that of the internal phase in the closed state. It will be seen that the presence of this lightly tinted binder has essentially the same effect in reducing the effect of pinholes and voids in the closed state (FIG. 1E), thus improving the contrast ratio of the medium as compared with the medium of FIGS. 1A and 1B, as does the heavily tinted but thin binder present in FIG. 1C. However, the grain in the open state (FIG. 1F) is greatly reduced compared to that in FIG. 1D since there is no over emphasis of the capsule walls in multilayer sections of the display cf. FIG. 1F.

According to a second embodiment of the present invention, inadequate contrast ratios of a variable transmission electrophoretic medium may be improved by including a charge control agent comprising a branched chain fatty acid having at least about 8 carbon atoms and an oligoamine-terminated polyolefin, such as OLOA® 11000. Encapsulating the electrophoretic media containing the charge control agent produces capsule-based media with substantially improved contrast ratios even at reduced operating voltages (and thus reduced power consumption), and low haze in the open state, which is of course important for variable transmission devices such as windows and vehicle sunroofs. The fatty acid used is preferably a water insoluble, oil soluble acid.

According to a third embodiment of the present invention, an improved electro-optic media is provided including encapsulated pigment particles and a binder. In particular, a mixture of fish gelatin and a polyanion, such as acacia has been found to be an excellent binder for use with capsules formed from a coacervate of (pig) gelatin and acacia. Polyanions that may be included in the binder with fish gelatin include, but are not limited to, carbohydrate polymers, such as starch and cellulose derivatives, plant extracts (e.g. acacia), and polysaccharides (e.g. alginate); proteins, such as gelatin or whey protein; lipids, such as waxes or phospholipids; and combinations thereof. This result is surprising because neither fish gelatin nor a polyanion, such as acacia, alone, are suitable binder materials for electro-optic media. As described below, fish gelatin, alone, has unacceptable kickback while a polyanion, such as acacia, alone, will shrink and crack when conditioned after coating. The resulting electro-optic medium has low haze when used in transmissive devices as well as less kickback, and thus greater long-term state stability. The electro-optic media can be coated over large surfaces and laminated with electrodes, etc., to create a variety of electro-optic devices, including sunlight-readable displays and smart windows.

The gelatin-based capsule walls used in the variable transmission devices have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein the gelatin is combined with acacia (gum arabic), which is derived from the hardened sap of the acacia tree. Acacia is a complex mixture of glycoproteins and polysaccharides, and it is often used as a stabilizer in food stuffs. The pH of aqueous solutions of acacia and gelatin can be tuned to form a polymer-rich coacervate phase that can encapsulate droplets of a non-polar internal phase, as described below.

Capsules incorporating gelatin/acacia may be prepared as follows; see, for example U.S. Pat. No. 7,170,670, incorporated by reference in its entirety. In this process, an aqueous mixture of gelatin and/or acacia is emulsified with a hydrocarbon internal phase (or other water-immiscible phase which it is desired to encapsulate) to encapsulate the internal phase. The solution may be heated to 40° C. prior to emulsification—to dissolve the gelatin. The pH is typically lowered to form a coacervate after the desired drop size distribution is achieved. Capsules are formed upon controlled cooling and mixing of the emulsion—typically to room temperature or lower. Proper mixing and certain encapsulation formulations (e.g. gelatin & acacia concentrations & pH) to discretely gel the coacervate around the internal phase droplets in a uniform manner are achieved if the wetting and spreading conditions are correct, which is largely dictated by the internal phase composition. The process yields capsules in the range of 20-100 μm and often incorporates over 50 percent of the starting materials into useable capsules. The capsules produced are then separated by size by sieving or other size exclusion sorting. Capsules larger than 100 µm are typically excluded because they are visible to the naked eye, and larger capsules increase the gap between electrodes, which increases the necessary drive voltage.

According to a fourth embodiment of the present invention, surprisingly, it has been discovered that adding larger capsules can improve the viewing experience through the open state in a variable transmission device. This result was not expected because, traditionally, variable transmission devices having a predominance of capsules in the range of 50 µm and 90 µm in diameter are "grainy" because of inconsistent capsule packing. It has been discovered that it is possible to achieve a variable transmission device with both good contrast and low grain by deliberately sorting capsules by size during fabrication of the electro-optic medium, and then deliberately combining select size distributions to achieve specific ratios of size distributions. The resulting variable transmission devices have low grain, good contrast, and diminished diffraction patterns when light sources are viewed through the device.

Figure 15:
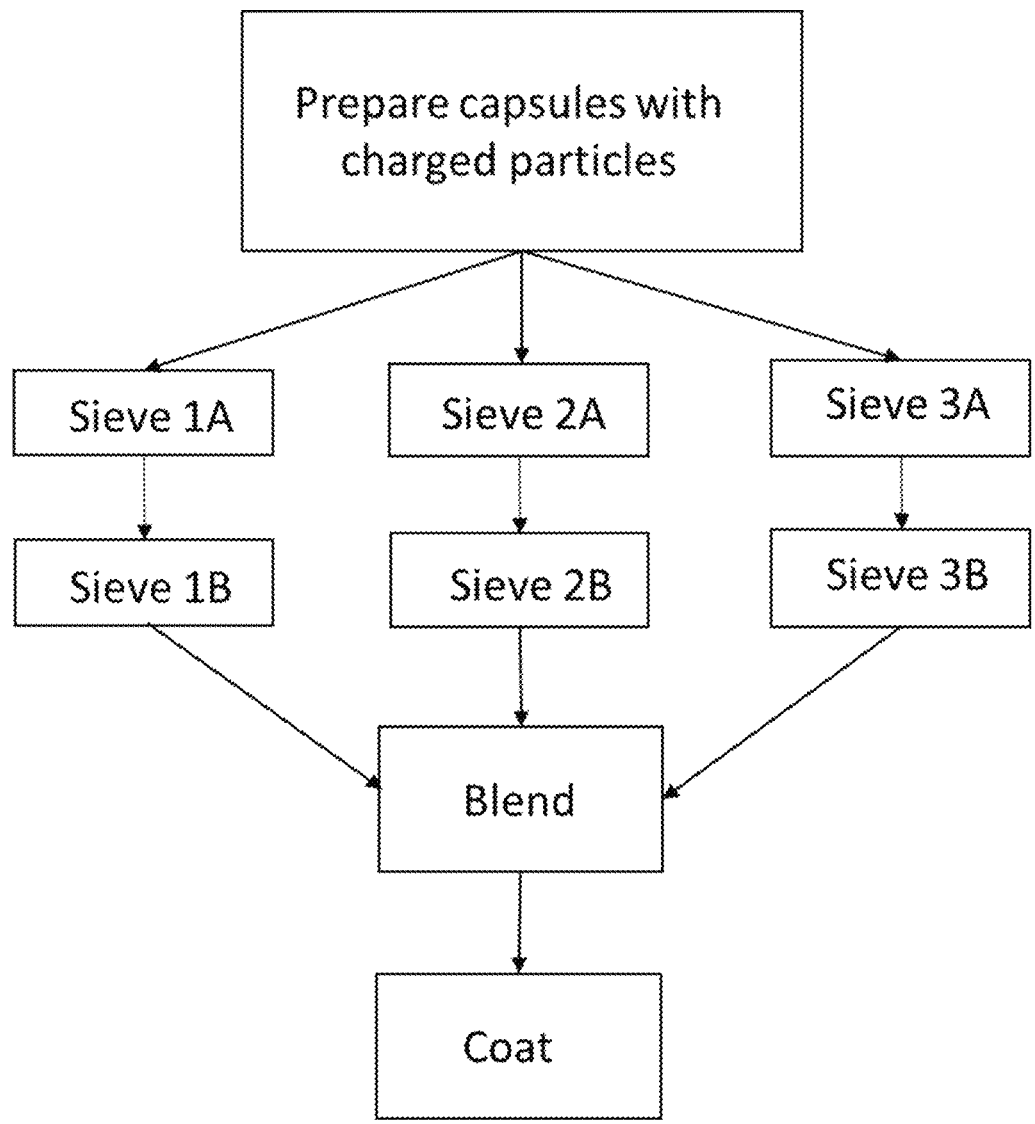
FIG. 15 is a flowchart describing a method for making an electro-optic medium with a predetermined distribution of capsule sizes.
Figure 16A:
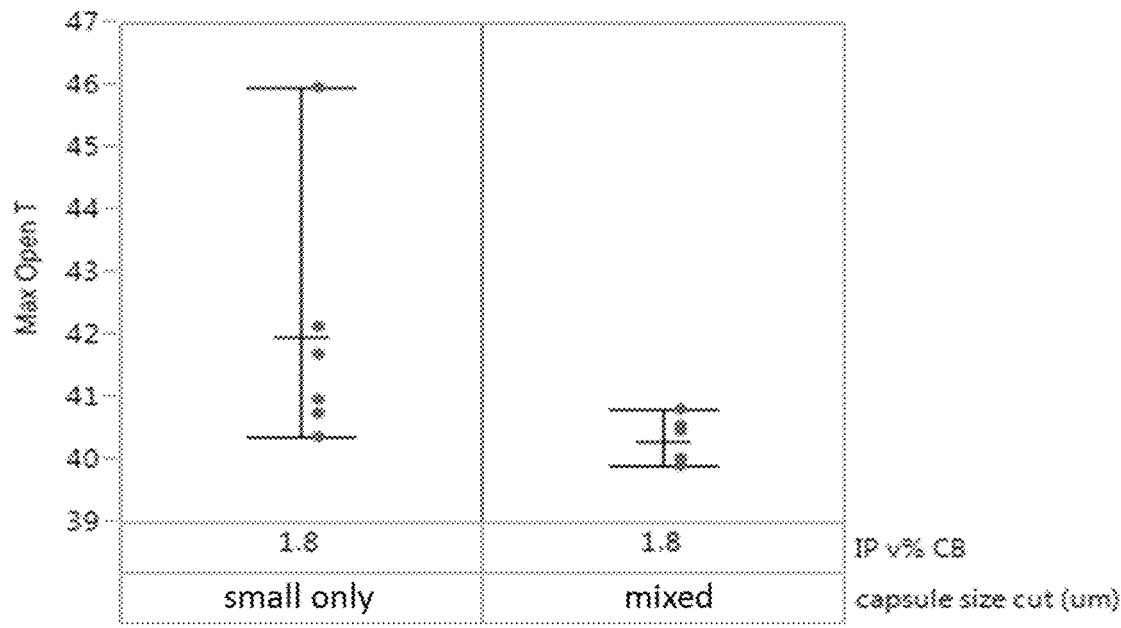
FIG. 16A shows differences in open state transmission for samples of variable transmission devices with only small capsules (left) and for variable transmission devices with a blend of large and small capsules (right).
Figure 16B:
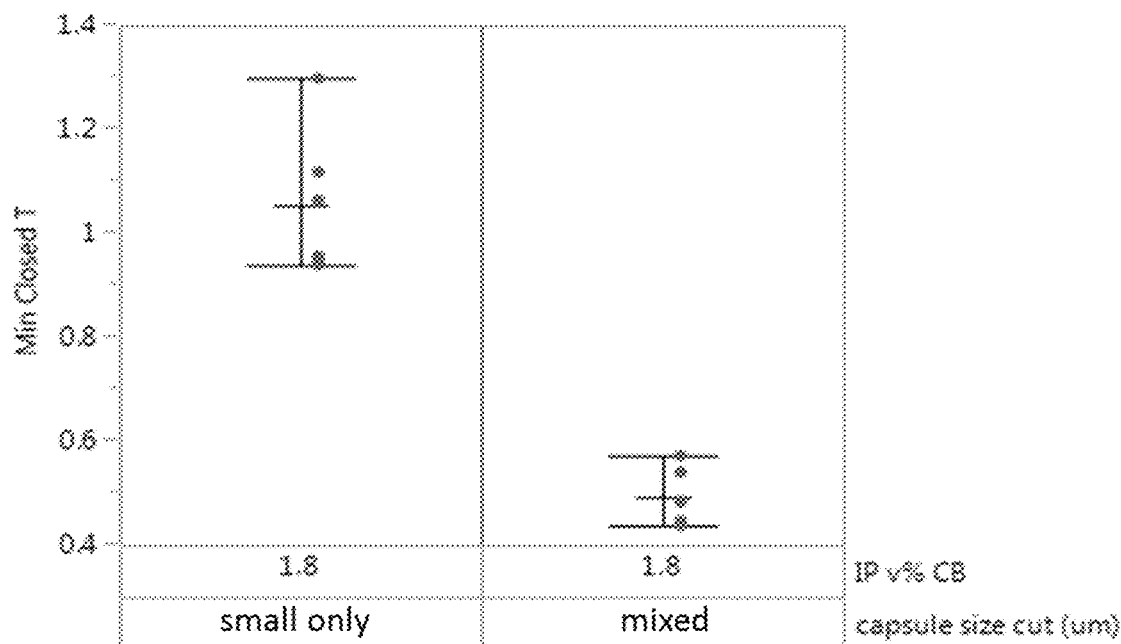
FIG. 16B shows differences in closed state transmission for samples of variable transmission devices with only small capsules (left) and for variable transmission devices with a blend of large and small capsules (right).
Figure 16C:
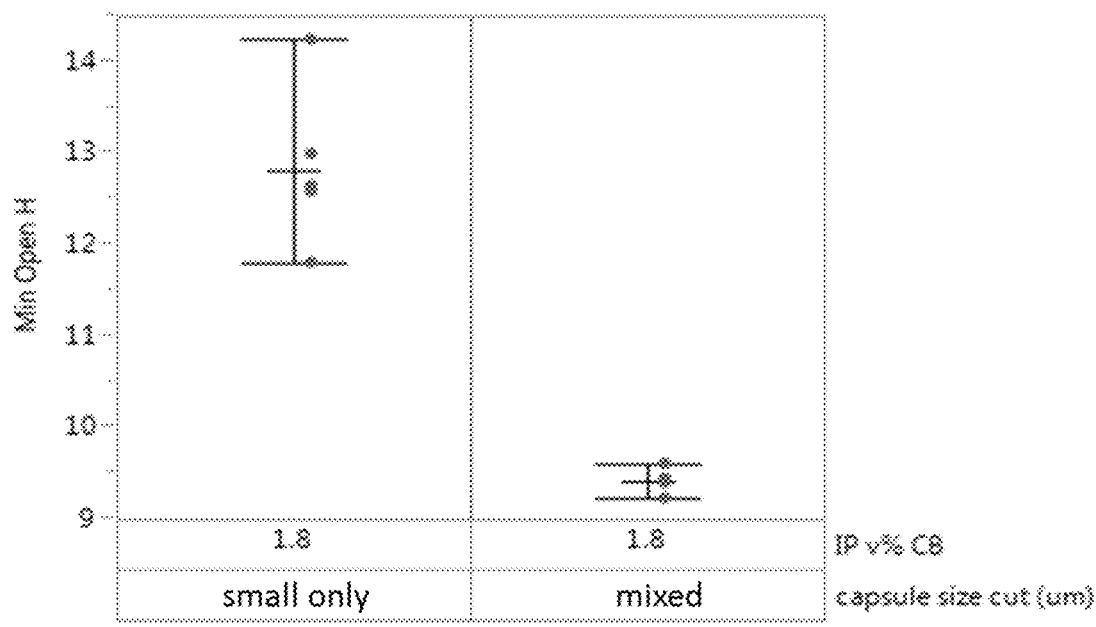
FIG. 16C shows differences in open state haze for samples of variable transmission devices with only small capsules (left) and for variable transmission devices with a blend of large and small capsules (right).
Figure 16D:
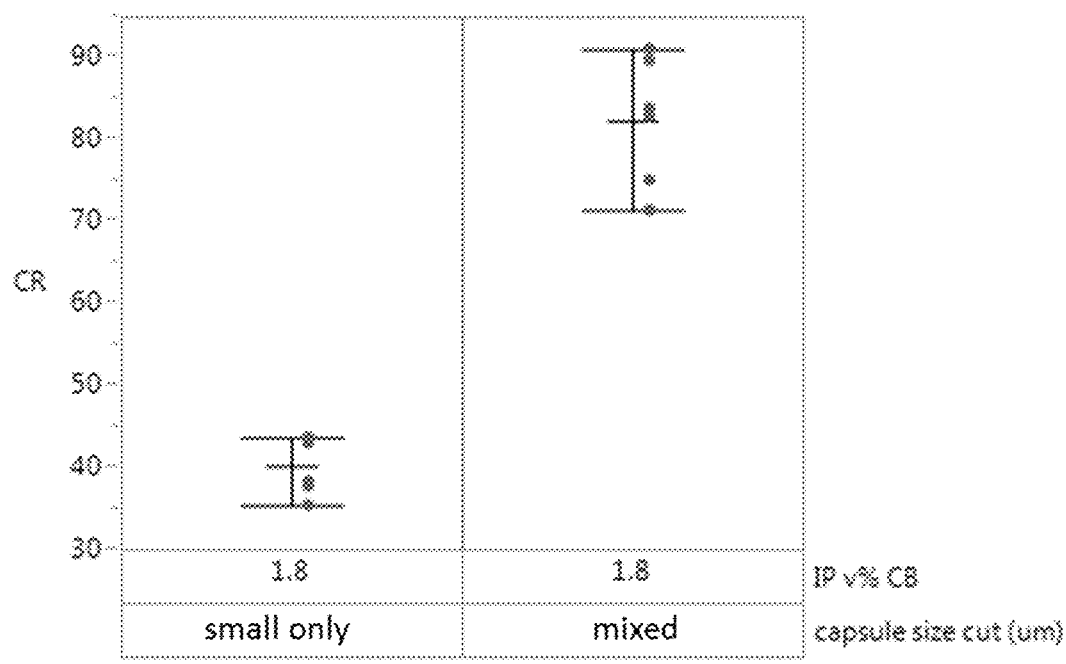
FIG. 16D shows contrast ratios (open transmission/closed transmission) for samples of variable transmission devices with only small capsules (left) and for variable transmission devices with a blend of large and small capsules (right). The blend of large and small capsules has far greater contrast between the open and closed states.

A process for preparing an electro-optic medium of the invention according to the fourth embodiment of the present invention can be seen in FIG. 15, where the process begins with the preparation of capsules including charge pigment particles, as described above. The resulting encapsulated electrophoretic media is then sieved according to size using a two-sieve process, generically sieve A and sieve B in FIG. 15. While three different size exclusions are shown, it is understood that additional size exclusions can be performed, however, it may only be necessary to partition the capsules into two size distributions. The size distributions are then recombined in the desired ratio (by weight) along with a polymeric binder, such as a gelatin to create an electro-optic medium that can be coated onto a light-transmissive electrode layer. The devices of the invention may comprise between two and five parts by weight of larger capsules for every one part by weight of the smaller capsules. In some embodiments there may be about three parts by weight of larger capsules for every one part by weight of smaller capsules.

After size sorting, the capsules are mixed with a binder to create a slurry for coating, e.g., using slot coating, knife coating, spin coating, etc. In the embodiments of the invention, the binder comprises a gelatin, typically fish gelatin. In preferred embodiments, the gelatin is combined with acacia, however it has been found that the mixture should not be complexed into a coacervate as maintaining slurry uniformity is more difficult. Additionally, it has been discovered that the haze of a transmissive medium can be improved by varying the amount of acacia that is added to the binder mixture.

To improve off-axis transparency of a display including a layer of the electro-optic media according to the various embodiments of the present invention, it may be advantageous to keep the layer as thin as possible, thus reducing the size of any particle structures extending through the thickness of the electrophoretic layer; however, as noted above, a thin electrophoretic layer requires a corresponding increase in the volume fraction of electrophoretic particles to achieve adequate opacity in the closed state of the display. Accordingly, there is likely to be an optimum thickness of the electrophoretic layer for any given selection of materials for use in a light modulator. Off-axis transparency can also be improved by controlling the particle structures so that they do not occupy the whole sidewalls of a droplet. In particular, it is advantageous to concentrate the particles so that the particle structures occupy only part of the sidewalls adjacent one major surface of the layer of electrophoretic medium. Such particle structures may be produced in accordance with the DC/AC drive method of the present invention by first bringing all the particles within a droplet adjacent one major surface of the electrophoretic layer by applying a DC field to the layer, and then driving the particles to the sidewalls using an AC field of appropriate frequency.

As previously noted, a variable transmission film of the invention may comprise a first light-transmissive electrode and a second light-transmissive electrode with an electrophoretic layer and a UV cure adhesive, such as a polyurethane acrylate blend, disposed between the first and second light-transmissive electrodes, such as the variable transmission film illustrated in FIG. 21. According to yet another embodiment of the present invention, a non-scattering colorant may be included in the adhesive layer of the variable transmission film. Tinting the adhesive of the film may further minimize grain and pinholes. The addition of a non-scattering colorant such as a dye or very small (<100 nm), well-dispersed pigment to the UV-cure adhesive may fill in the capsule layer pinholes and as a result, lower the light transmission through pinholes. Tinted UV adhesives may also dramatically improve the grain of variable transmission films. Examples of tinting agents include, but are not limited to, Macrolex Black 2B, Keyplast Black AN, Macrolex Violet 3R, Macrolex Blue 3R, Orasol Black X51, and Orasol Black X55.

The adhesive composition according to the various embodiments of the present invention preferably contains 0.25 to 0.5 phr of one or more tinting agents. The adhesive is not limited to being tinted with a single material. Blends of pigments and/or dyes may be used to improve light and temperature fastness. Depending on the application for the variable transmission film, the color of the adhesive may be tuned by choice of color dye/pigment without having to change the underlying capsule layer.

While not wishing to be bound by theory, it is likely that some grain may be caused by thickness variations in the capsule layer, and by using UV cure adhesive that is 100% solids and effective at planarizing, the variable thickness of the tinted adhesive layer may effectively complement the shape of the capsule layer. For example, the thickest portions of the tinted adhesive would be located adjacent to the location of pinholes in the capsule layer, thereby providing the most tinting in locations where it is most needed (see FIGS. 22A, 22B, 23A, and 23B). The addition of an adhesive soluble black dye such as Keyplast Black AN, for example, may be able to lower the open state grain (cqi score) and closed state pinholes without any increase in open state haze. Because the UV curable adhesive layer is unable to change its transmission during device switching it is preferred to select a tinting agent loading such that the adhesive layer transmission is between the transmission of the open and closed state of the capsule layer. For example, if a device with ~1 mil capsule layer had a closed state transmission of ~1% and an open state transmission of ~30% then an adhesive layer that is ~1 mil thick should be tinted to have a transmission between 1 and 30% to complement the active capsule layer.

EXAMPLES

Examples are now given, though by way of illustration only, to show details of electrophoretic media made according to various embodiments of the present invention.

I. Variable Transmission Medium Containing Tinted Binder

Example 1

A non-aqueous internal phase was prepared by combining OLOA® 11000, 1-limonene, Cargille® 5040 immersion fluid, carbon black, polystyrene, and sorbitan trioleate. The resultant mixture encapsulated by adding the mixture to an aqueous gelatin/acacia solution while stirring. After the addition of the internal phase was complete, the mixture was emulsified. After a period of mixing, heating, and pH adjustment the mixture was cooled and the resulting capsules were sieved to a range of 20-60 μm, with a mean size of 30-40 μm.

The resulting capsules were then mixed with an aqueous binder of fish gelatin (Norland HiPure Liquid Gelatin) at a ratio of 1 part by weight binder to 7 parts by weight of capsules, and an aqueous colorant dispersion comprising 10 weight percent Emperor 2000 carbon black with 5 weight percent Kolliphor P188 at a ratio of 1 part colorant dispersion to 49 parts binder. The resultant mixture was bar coated on to a 125 mm thick indium-tin oxide coated polyester film (the capsules being deposited on the ITO-coated face), and the coated film was dried to produce an electrophoretic medium approximately 25 μm thick containing essentially a single layer of capsules.

The exposed surface of the electrophoretic medium was then overcoated with a radiation-curable urethane acrylate based adhesive. As the adhesive layer was applied, a screen-printed sheet of 125 mm thick indium-tin oxide coated polyester film was applied. The resulting assemblies were then cured by exposure to ultraviolet light.

A second capsule-based electrophoretic display was prepared in a similar manner except that the colorant dispersion was omitted.

Figure 2:
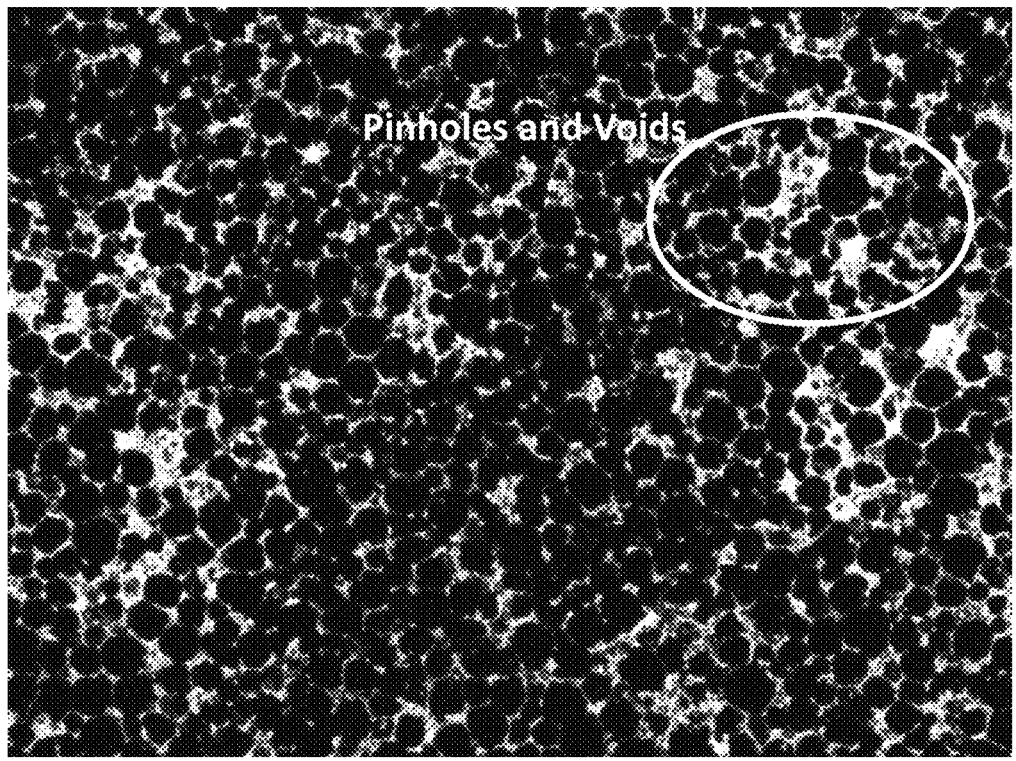
FIG. 2 is a photomicrograph of the closed state of a prior art display as shown in FIG. 1A, and illustrates the poor contrast ratio of such a display.

FIG. 2 is a photomicrograph of a capsule-based electrophoretic medium similar to that shown in FIGS. 1A and 1B with an untinted binder in its closed state (in effect, FIG. 2 is a top plan view of the medium of FIG. 1A). It will be seen that in various areas of the medium (see the circled area and the center left of FIG. 2) large numbers of pinholes and voids are present, resulting in these areas being much lighter in color even in the closed state than the remaining areas, with a resultant high minimum transmission and poor contrast ratio.

Figure 3:
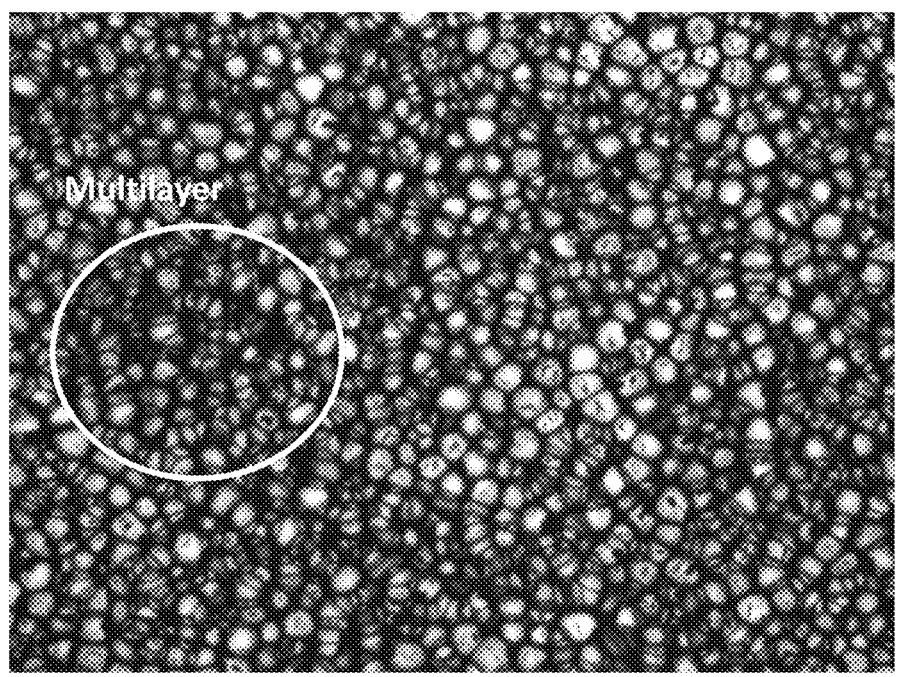
FIG. 3 is a photomicrograph of the open state of a display as shown in FIG. 1D and illustrates the dark multilayers present and the resultant grain.

FIG. 3 is a photomicrograph of a capsule-based electrophoretic medium similar to that shown in FIGS. 1C and 1D with a heavily tinted binder in its open state (in effect, FIG. 3 is a top plan view of the medium of FIG. 1D). It will be seen that in various areas of the medium (see especially the circled area) multiple layer of capsules are present, and these areas appear darker than the surrounding monolayer areas, resulting in excessive grain.

Figure 4:
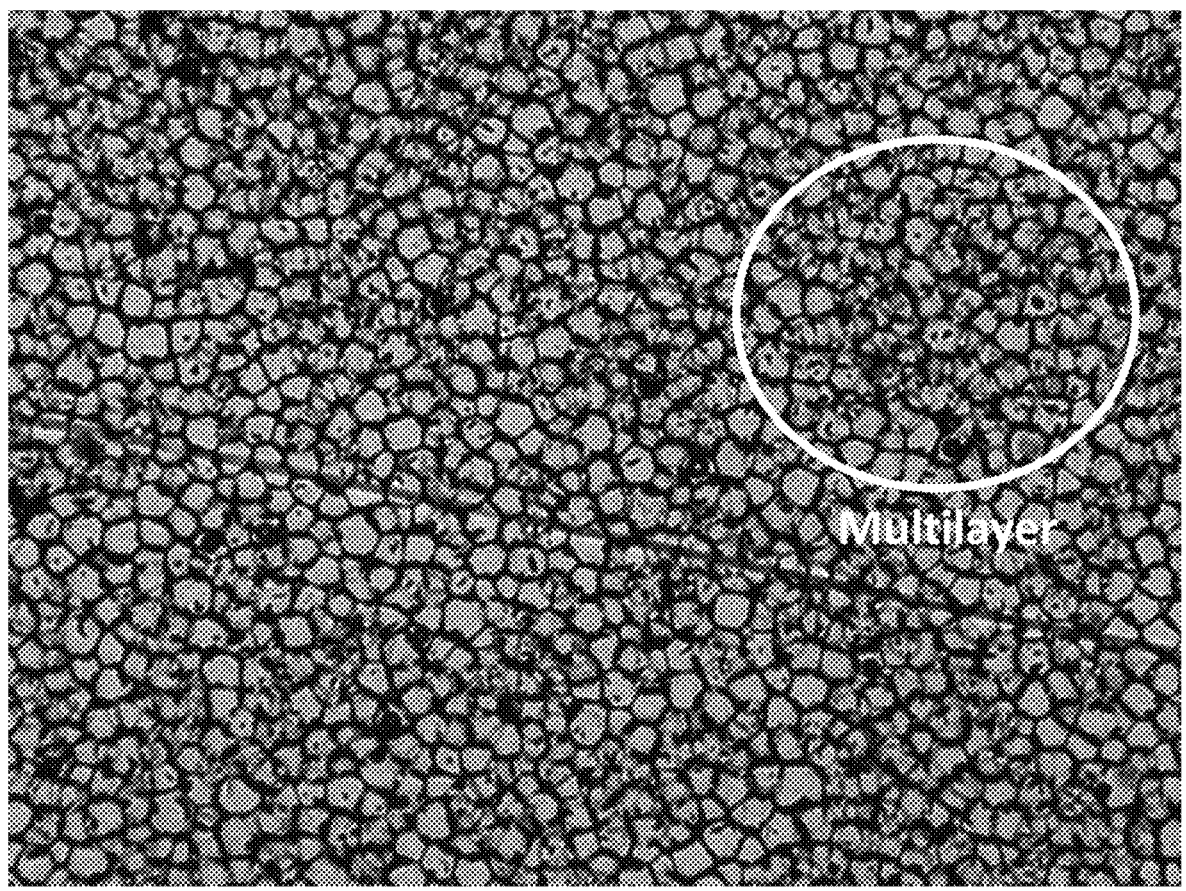
FIG. 4 is a photomicrograph similar to that of FIG. 3 but showing the open state of a display as shown in FIG. 1F.

FIG. 4 is a photomicrograph similar to FIG. 3 but of a capsule-based electrophoretic medium similar to that shown in FIGS. 1E and 1F with an increased proportion of a binder less tinted than that shown in FIG. 3, the medium being shown in its open state (in effect, FIG. 3 is a top plan view of the medium of FIG. 1F). It will be seen that in various areas of the medium (see especially the circled area) multiple layers of capsules are present, but these areas do not contrast excessively with the surrounding monolayer areas, resulting in a much lower grain that in the medium of FIG. 3.

Figure 5A:
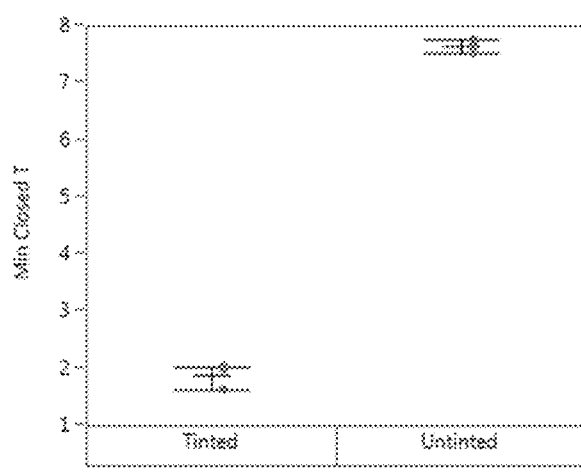
FIGS. 5A-5C are graphs showing the amount of light transmitted in the closed state (FIG. 5A), the amount of light transmitted in the open state (FIG. 5B) and the resultant contrast ratios (FIG. 5C) for displays having uncolored binder (as shown in FIGS. 1A/1B) and colored binder (FIGS. 1E/1F).
Figure 5B:
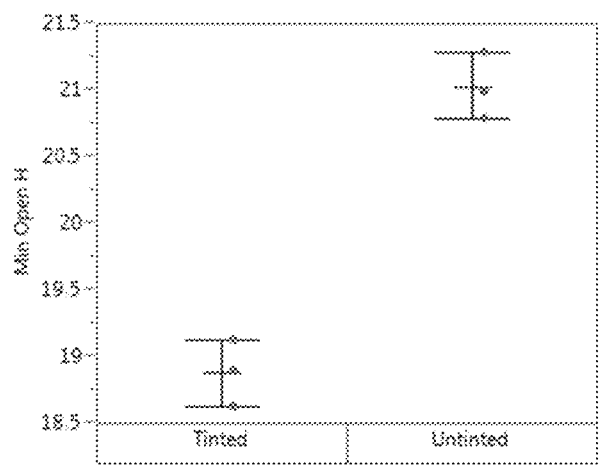
Figure 5C:
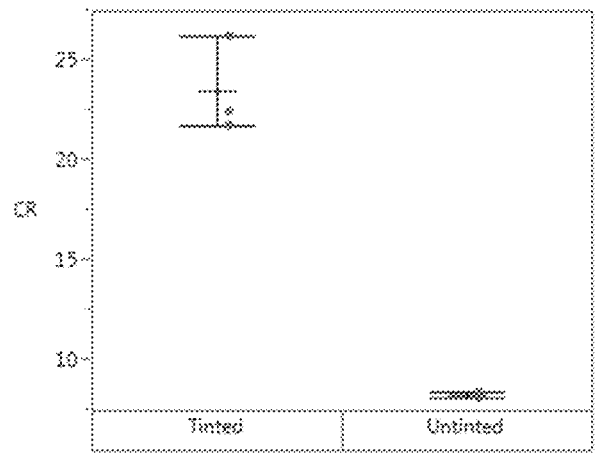

FIGS. 5A, 5B, and 5C show respectively the minimum transmission in the closed state, the minimum transmission in the open state, and the contrast ratio for single pixel displays prepared using a capsule-based electrophoretic medium with an untinted binder (as shown in FIGS. 1A and 1B) and a similar medium with an optimally tinted binder (as shown in FIGS. 1E and 1F). From FIGS. 5A-5C it will be seen that the tinting of the binder reduced the minimum transmission in the closed state from about 7.5 percent to about 2 percent, while reducing the transmission in the open state only from about 21 percent to about 19 percent, thus increasing the contrast ratio from about 9 to about 23.

Figure 6A:
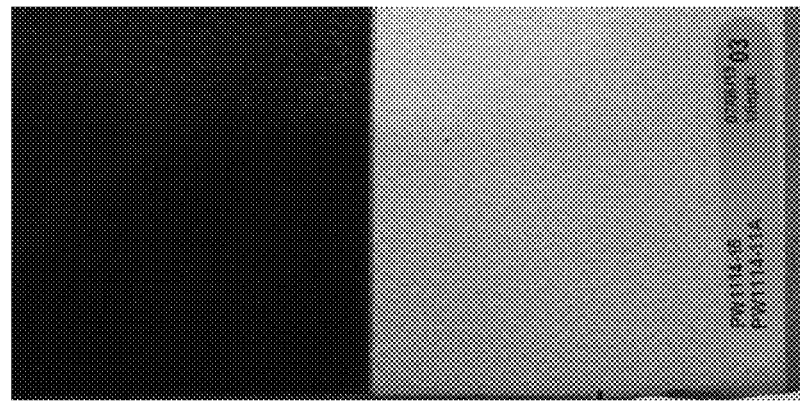
FIGS. 6A and 6B are photographs showing the closed and open states of single pixels displays in accordance with FIGS. 1C/1D (FIG. 6A) and FIGS. 1E/1F (FIG. 6B) and illustrate the improvement in grain provided by the present invention.
Figure 6B:
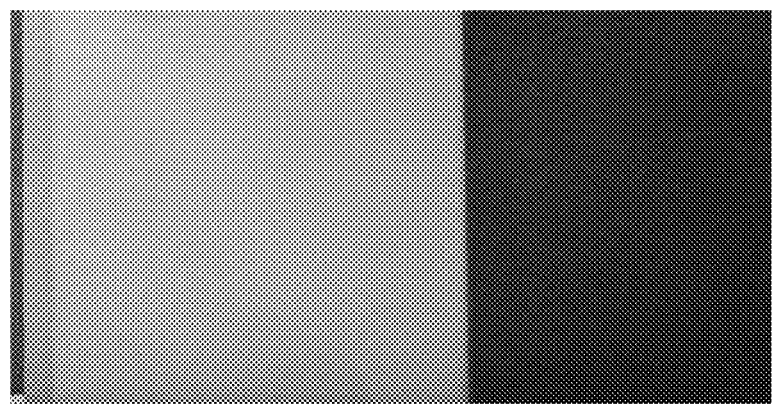

FIGS. 6A and 6B are photographs showing the open and closed states of capsule-based electrophoretic media with a highly tinted binder (as shown in FIGS. 1C and 1D-FIG. 6A) and an optimally tinted binder (as shown in FIGS. 1E and 1F-FIG. 6B). It will be seen that the highly tinted binder medium exhibits much more grain than the optimally tinted one.

Example 2

A nonaqueous internal phase was prepared by combining OLOA® 11000, 1-limonene, Cargille® 5040 immersion fluid, carbon black, polystyrene, and 2-hexyldecanoic acid. The internal phase thus prepared was then encapsulated by adding the mixture to an aqueous solution of porcine gelatin and acacia followed by addition of Emperor 2000 carbon black with 5 wt % Kolliphor P188. After heating, mixing, and pH adjustment, the resulting capsules were cooled and then sorted to create a mixture of capsules with a size distribution between 20 and 90 μm diameter, with a mean diameter of 50-70 μm.

The capsule slurry was centrifuged and then mixed with an aqueous binder of 50:50 fish gelatin (Norland HiPure Liquid Gelatin): acacia (AEP colloids) at a ratio of 1 part by weight binder to 4 parts by weight of capsules. A solution of colorant (7 wt % Emperor 2000 carbon black with 3.5 wt % Kolliphor P188 (Sigma-Aldrich 15759), 1.5 wt % Cab-o-jet 265M (Cabot Corp) and 1.5 wt % Cab-o-jet 250C (Cabot Corp)) was prepared in water and then added to the aqueous binder at a ratio of 1 part colorant to 52.3 parts binder. The resultant mixture of binder and encapsulated internal phase was bar coated on to a 125 μm thick indium-tin oxide coated polyester film. The coated film was dried to produce an electrophoretic medium approximately 33 μm thick containing essentially a single layer of capsules.

The capsule-coated surfaces of the coated films were then overcoated with a urethane acrylate based adhesive. As the adhesive layer was added, a screen-printed sheet of 125 mm thick indium-tin oxide coated polyester film was applied. The resulting assemblies were then cured by exposure to UV light from a CSun UV lamp.

Figure 19:
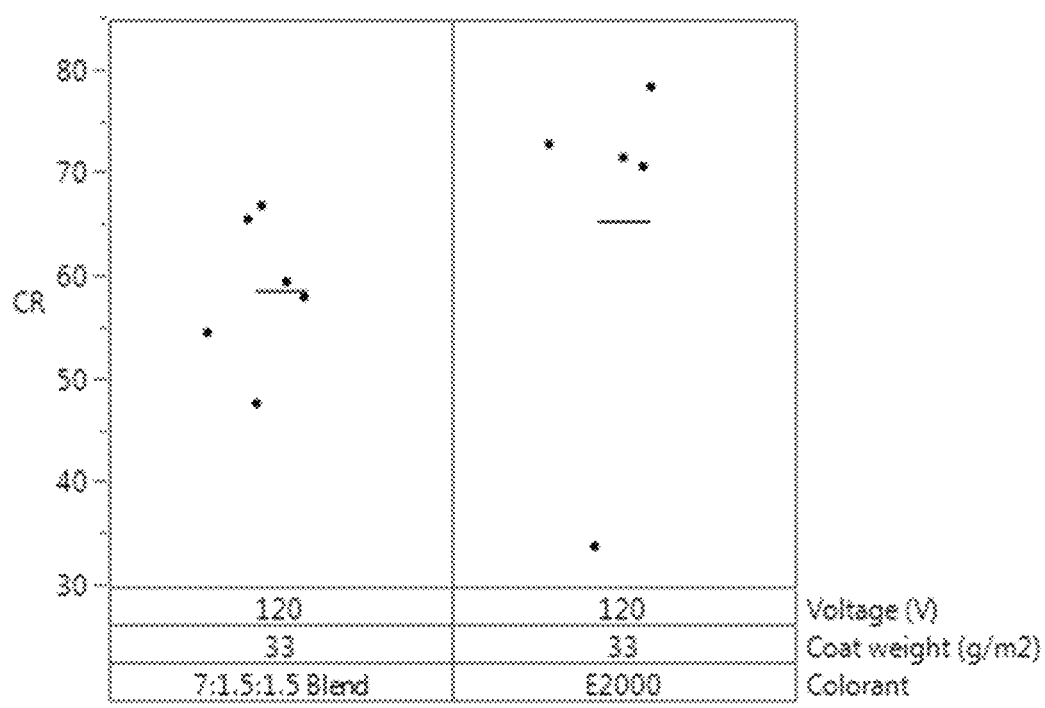
FIG. 19 shows contrast ratio measurements for a binder with 3 parts cyan to 3 parts magenta to 14 parts black (left) and a binder with only carbon black colorants (right). While the contrast ratio is better with the black-only binder, the contrast ratio with the color-blend binder is sufficient for most variable transmission applications.
Figure 20:
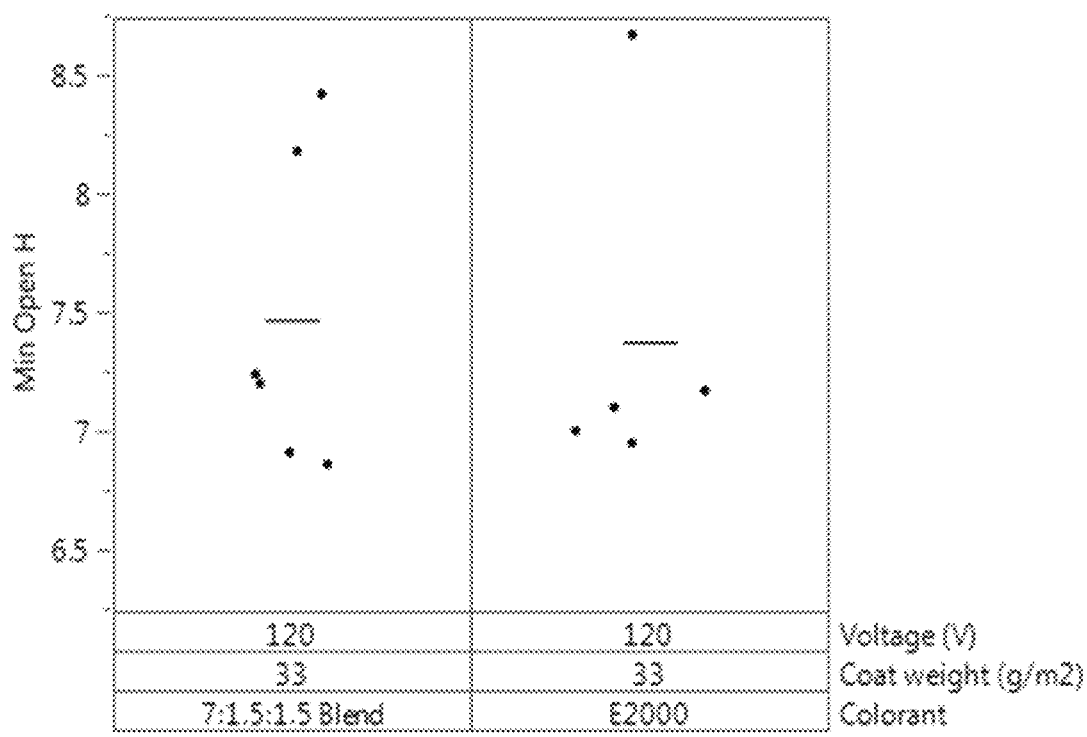
FIG. 20 shows haze measurements for a binder with 3 parts cyan to 3 parts magenta to 13 parts black (left) and a binder with only carbon black colorants (right). The haze for both formulations is quite low.

Using the techniques above, neutral density window pixels (i.e., top and bottom light-transmissive electrodes) were built with binder colored with a mixture of Emperor 2000 carbon black, Cab-o-jet 265M magenta pigment and Cab-o-jet 250C cyan pigment. As a control, similar window pixels were constructed using identical techniques except that an equivalent weight of the colored pigment mixture was replaced with Emperor 2000 carbon black. Using an optical evaluation test bench, the contrast ratio and the haze were evaluated for the samples. As shown in FIGS. 19 and 20, the contrast ratio and haze for the color mixture was almost as good as the control.

While the optical performance was nearly equivalent, the difference in color between the two samples in the open state was obvious to the naked eye. In an effort to quantify the difference in color, reflectance measurements were made on double transmissive-electrode test cells against a white printing paper background. As shown in TABLE 1, the samples with blends of pigment in their binder had more neutral color (a* and b* values closer to zero) and greater overall reflectivity.

TABLE 1

Reflectivity measurements through a dual-window test pixel of identical internal phases with binders including A) only Emperor 2000 carbon black at about 2% colorant weight; and B) a mixture of colorants (14 parts Emperor 2000 carbon black, 3 parts Cab-o-jet 265M magenta, and 3 parts Cab-o-jet 250C cyan) at about 2% colorant mixture weight.

| Sample | L* | a* | b* |
|---|---|---|---|
| White paper | 94.6 | 3.99 | −11.45 |
| A) Just carbon black window | 37.5 | 1.64 | 6.38 |
| B) Neutral color window | 40.75 | −0.05 | 3.38 |

II. Variable Transmission Medium Containing CCA Blends

A non-aqueous internal phase was prepared by combining OLOA® 11000, 1-limonene, Cargille® 5040 immersion fluid, carbon black, polystyrene, and 2-hexyldecanoic acid. The resultant mixture was then encapsulated by adding the mixture to an aqueous gelatin/acacia solution, emulsifying the mixture, and adding a dispersion of Emperor 2000 carbon black with 5 weight percent Kolliphor P 188. After mixing, heating, and pH adjustment, the resulting capsules were cooled and sieved to a range of 20-60 μm, with a mean size of 30-40 μm.

The capsules were centrifuged and then mixed with an aqueous binder of fish gelatin (Norland HiPure Liquid Gelatin): at a ratio of 1 part by weight binder to 7 parts by weight of capsules, and an aqueous colorant dispersion comprising 10 weight percent Emperor 2000 carbon black with 5 weight percent Kolliphor P188 at a ratio of 1 part colorant dispersion to 49 parts binder. The resultant mixture was bar coated on to a 125 mm thick indium-tin oxide coated polyester film (the capsules being deposited on the ITO-coated face), and the coated film was dried to produce an electrophoretic medium approximately 25 μm thick containing essentially a single layer of capsules.

The exposed surface of the electrophoretic medium was then overcoated with a radiation-curable urethane acrylate based adhesive. As the adhesive layer was applied, a screen-printed sheet of 125 μm thick indium-tin oxide coated polyester film was applied. The resulting assemblies were then cured by exposure to ultraviolet light.

The electro-optic properties of the capsule-based electrophoretic media produced as described above was compared to other similar capsule-based electrophoretic media, except that the charge control agents used in the comparative samples were OLOA® 11000 alone or in combination with Pluronic L31 (two samples), Span 65, and Span 85 (two samples). The coating weight, internal phase conductivity and viscosity, and the contrast ratio at driving voltages of 72, 90 and 120 Volts and relative humidities of 50 and 60 percent, were measured for each medium, and the results are shown in FIG. 7.

Figure 7:
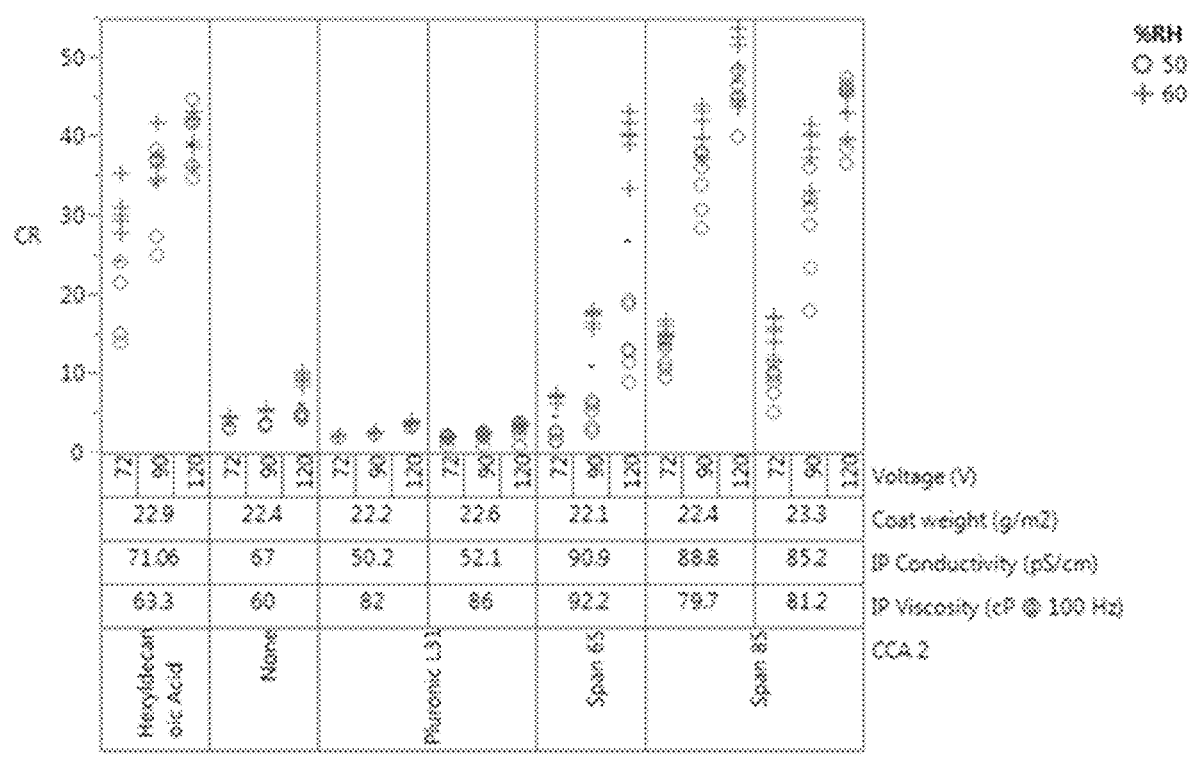
FIG. 7 of the accompanying drawings is a graph showing the contrast ratios achieved with encapsulated electrophoretic media using combinations of OLOA and various other charging agents.

From FIG. 7, it will be seen that the medium containing OLOA® 11000 alone had an undesirably low contrast ratio, and addition of Pluronic L31 produced essentially no change. Addition of Span 65 produced some increase in contrast ratio, especially at 120 V, although the measured contrast ratios were extremely susceptible to changes in humidity. Addition of Span 85 produced better results than addition of Span 65, although again the measured contrast ratios were extremely susceptible to changes in humidity, and a high driving voltage of 120 V was necessary to achieve consistent high contrast ratios above 30. The results achieved by addition of 2-HDA were the best of those of the tested compositions enabling high contrast ratios to be achieved even at 72 V, with reduced humidity dependence.

Example 2

Various experimental displays were prepared in the same way as described in Example 1 above, but with 2-HDA: OLOA® 11000 weight ratios of 0.025:1, 0.05:1, 0.1:1 and 0.2:1 respectively. To provide a control, a similar display was prepared using Span 85 and OLOA® 11000 at a weight ratio of 0.825:1 (the greater molecular weight of Span 85 renders this ratio approximately equal, on a mole-to-mole basis, to a 2-HDA:OLOA® ratio of 0.2:1). The coating weight, internal phase conductivity, contrast ratio, and minimum haze values were measured at the same driving voltages and relative humidities as in Example 1 above, and the results are shown in FIGS. 8 and 9.

Figure 8:
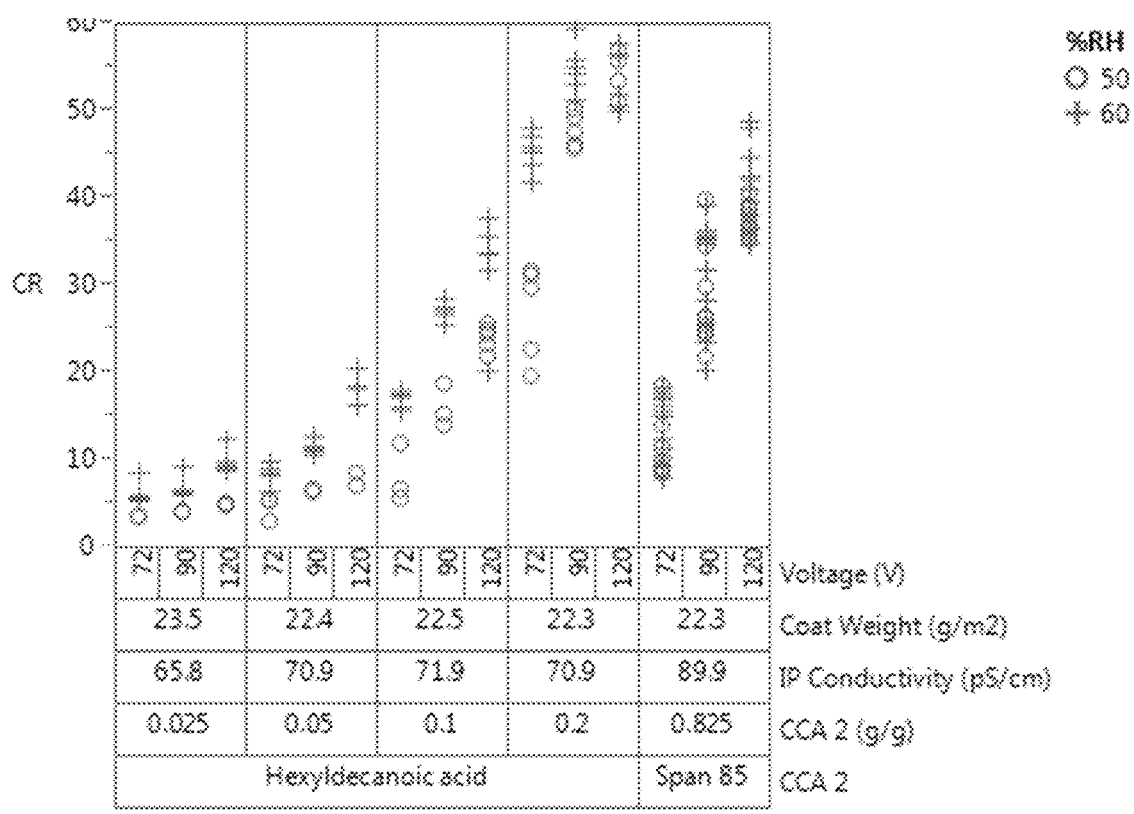
FIG. 8 is a graph similar to that of FIG. 7 but showing the contrast ratios achieved with OLOA and varying proportions of 2-HDA, or a control CCA.
Figure 9:
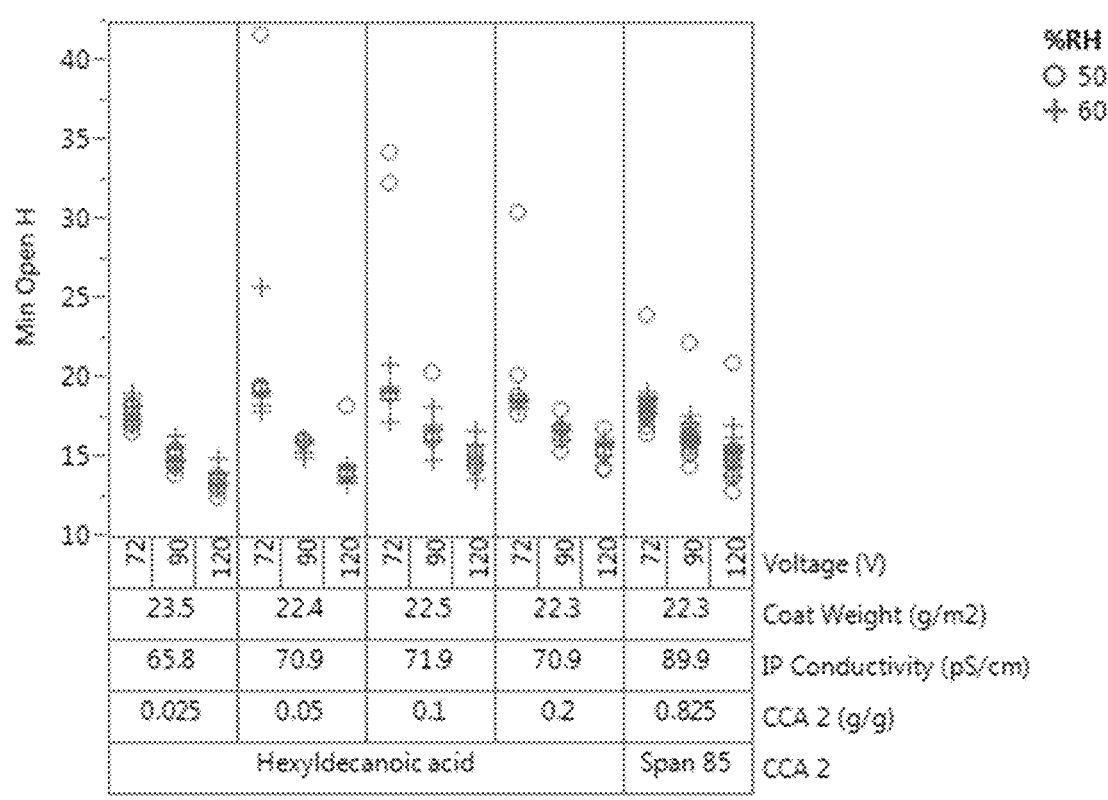
FIG. 9 is a graph similar to that of FIG. 8 but showing minimum haze values instead of contrast ratios.
Figure 10A:
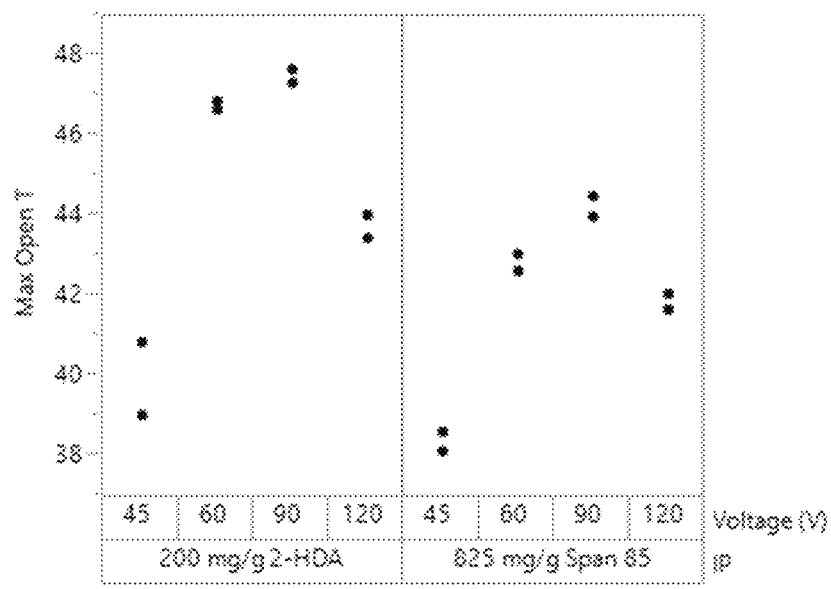
FIGS. 10A-10D are graphs showing respectively the minimum open state transmission, the minimum closed state transmission, the minimum open state haze and the contrast ratio for encapsulated electrophoretic media using OLOA/2-HDA and OLOA/Span 85 charge control agents at varying driving voltages.
Figure 10B:
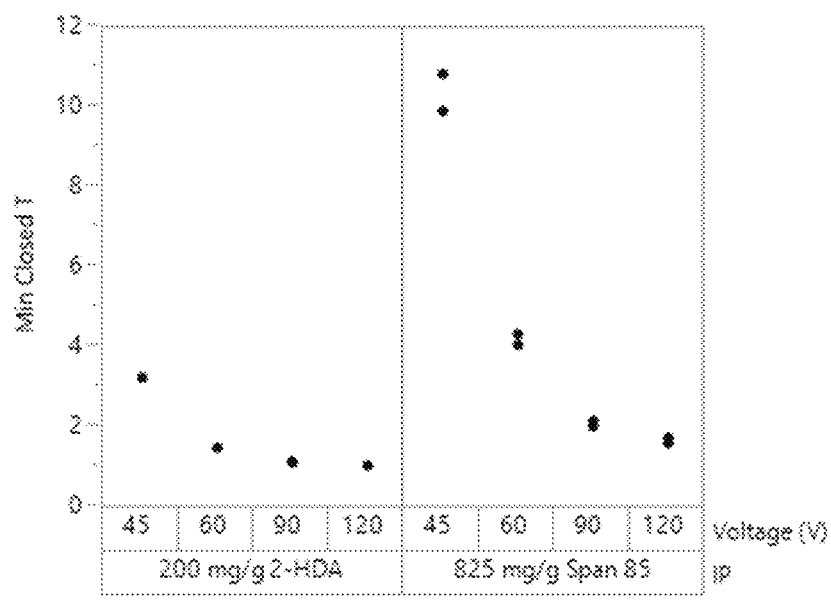
Figure 10C:
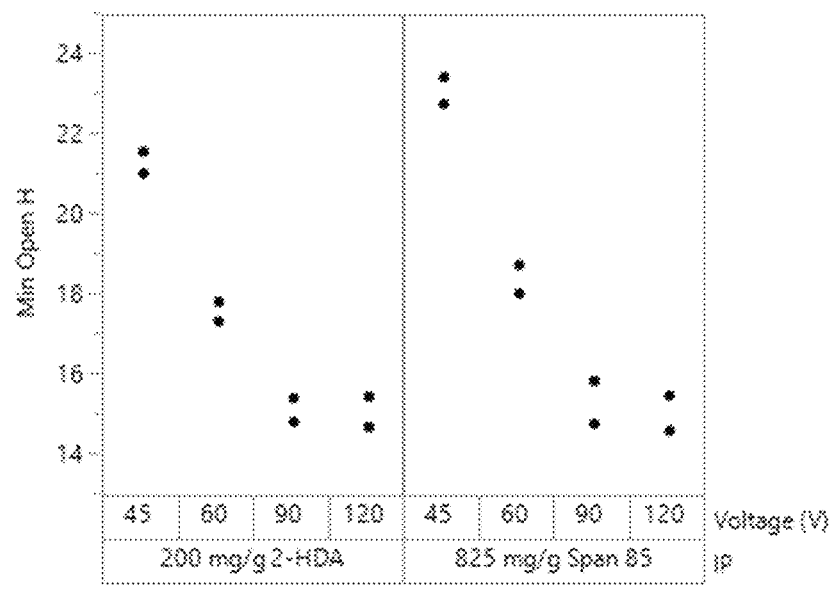
Figure 10D:
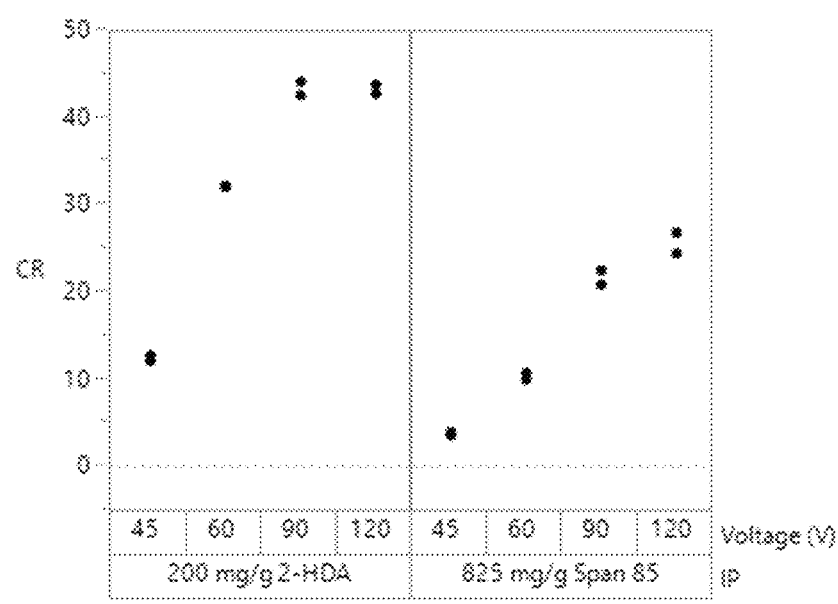

From FIGS. 8 and 9, it will be seen that the contrast ratios of the 2-HDA displays increased monotonically with both the proportion of 2-HDA and the driving voltage, reaching values well in excess of 30 at a 2-HDA ratio of 0.2:1 and a driving voltage of 90 V, which is substantially greater than the corresponding values for the Span 85 display. The minimum haze values did not vary greatly with the proportion of 2-HAD, but did tend to decrease with increasing driving voltage. Accordingly, the displays having a 2-HDA: OLOA® 11000 weight ratio of 0.2:1 gave the best overall performance Example 3

The displays prepared in Example 2 above containing 2-HDA and OLOA® at a weight ratio of 0.2:1 and Span 85 and OLOA® at a weight ratio of 0.825:1 were subjected to further testing at driving voltages of 45, 60, 90 and 120 V. FIGS. 10A-10D show respectively, the maximum open transmission, minimum closed transmission, minimum open haze and contrast ratio determined in these tests.

From FIGS. 10A-10D, it will be seen that the display containing 2-HDA exhibited higher maximum open transmission, lower minimum closed transmission, lower open haze and substantially higher contrast ratio under the same conditions as the display containing Span 85. In particular, the Span 85 display failed to achieve the desirable contrast ratio of 30 under any of the tested conditions, whereas the 2-HDA display consistently achieved this contrast ratio at driving voltages of at least 60 V.

Example 4

Displays were prepared as in Example 1 above containing 2-HDA and OLOA® at a weight ratio of 0.2:1 and oleic acid and OLOA® at a weight ratio of 0.4:1. These displays were subjected to testing at driving voltages of 72, 90 and 120 V. FIG. 5 shows the contrast ratios determined in these tests.

Figure 11:
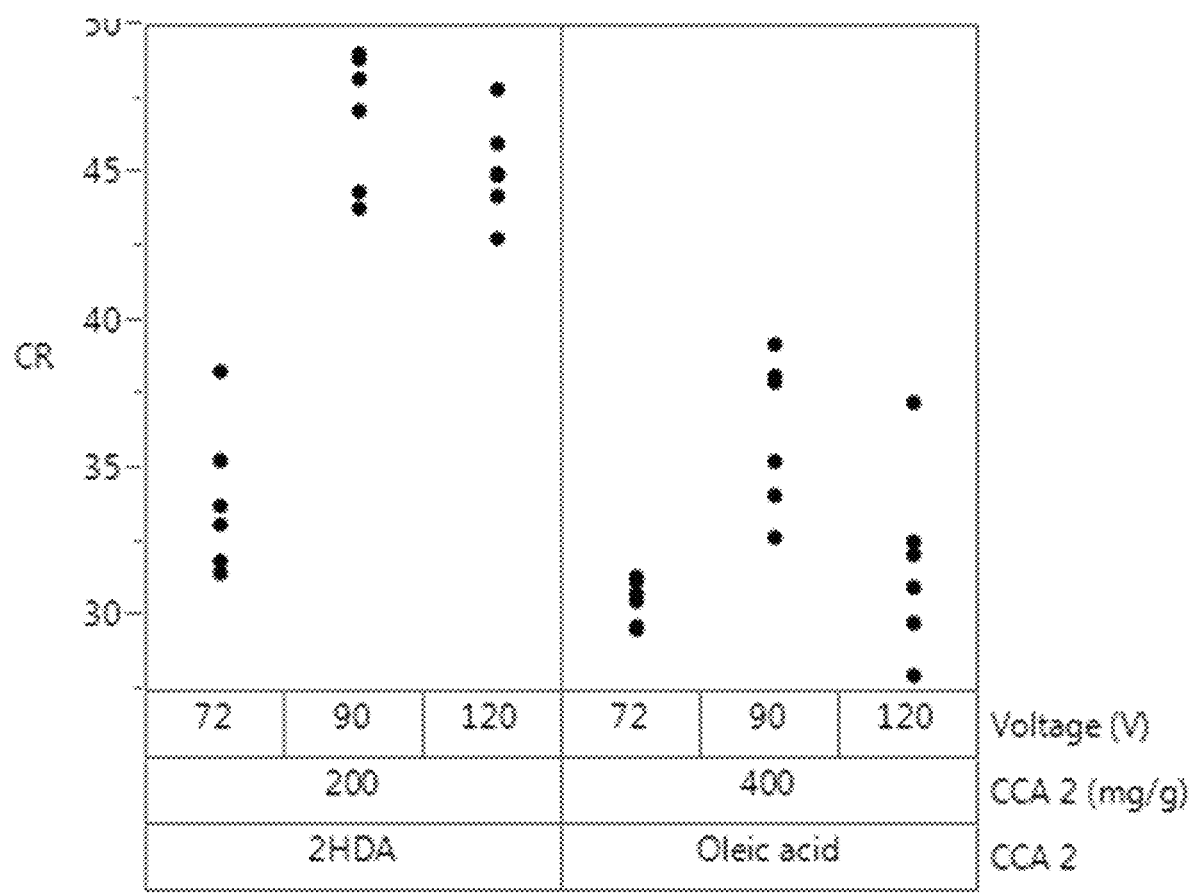
FIG. 11 is a graph similar to that of FIG. 10D but showing contrast ratios achieved by encapsulated electrophoretic media using OLOA/2-HDA and OLOA/oleic acid charge control agents at varying ratios and at various driving voltages.

From FIG. 11, it will be seen that the display containing 2-HDA consistently exhibited substantially higher contrast ratios under the same conditions as the display containing oleic acid.

III. Variable Transmission Medium Containing Fish Gelatin: Acacia Binder

A nonaqueous internal phase was prepared by combining OLOA® 11000, 1-limonene, Cargille® 5040 immersion fluid, carbon black, polystyrene, and 2-hexyldecanoic acid. The internal phase mixture was then encapsulated by adding the mixture to an aqueous gelatin/acacia solution, emulsifying the mixture, and adding a dispersion of 10 wt. % Emperor 2000 carbon black with 5 wt. % Kolliphor P188. After mixing, heating, and pH adjustment, the resulting capsules were cooled and sorted with sieves to create a mixture of capsules ranging in size from 15-50 μm with a mean size of approximately 30 μm.

The resulting aqueous capsule slurries were centrifuged and then mixed into three different aqueous fish gelatin-based binders; A) having no acacia, B) a 1:2 mixture of acacia to fish gelatin, and C) a 1:1 mixture of acacia to fish gelatin. The fish gelatin was procured from Norland as HiPure Liquid Gelatin, and the acacia from AEP colloids. Each gelatin binder was mixed at a ratio of 1 part by weight binder to 7 parts by weight of capsules, and a solution of 10 wt. % Emperor 2000 carbon black with 5 wt. % Kolliphor P188 (Aldrich 15759) in water with a ratio of 1 part carbon black colorant to 49 parts binder. The resultant mixture was bar coated on to a 125 μm thick indium-tin oxide coated polyester film. The coated film was allowed to dry to produce an electrophoretic medium approximately 25 μm thick containing essentially a single layer of capsules.

The capsule-coated surfaces of the coated films were then overcoated with a urethane acrylate based adhesive. As the adhesive layer was added, a screen-printed sheet of 125 mm thick indium-tin oxide coated polyester film was applied. The resulting assemblies were then cured by exposure to UV light from a CSun UV lamp.

Figure 13A:
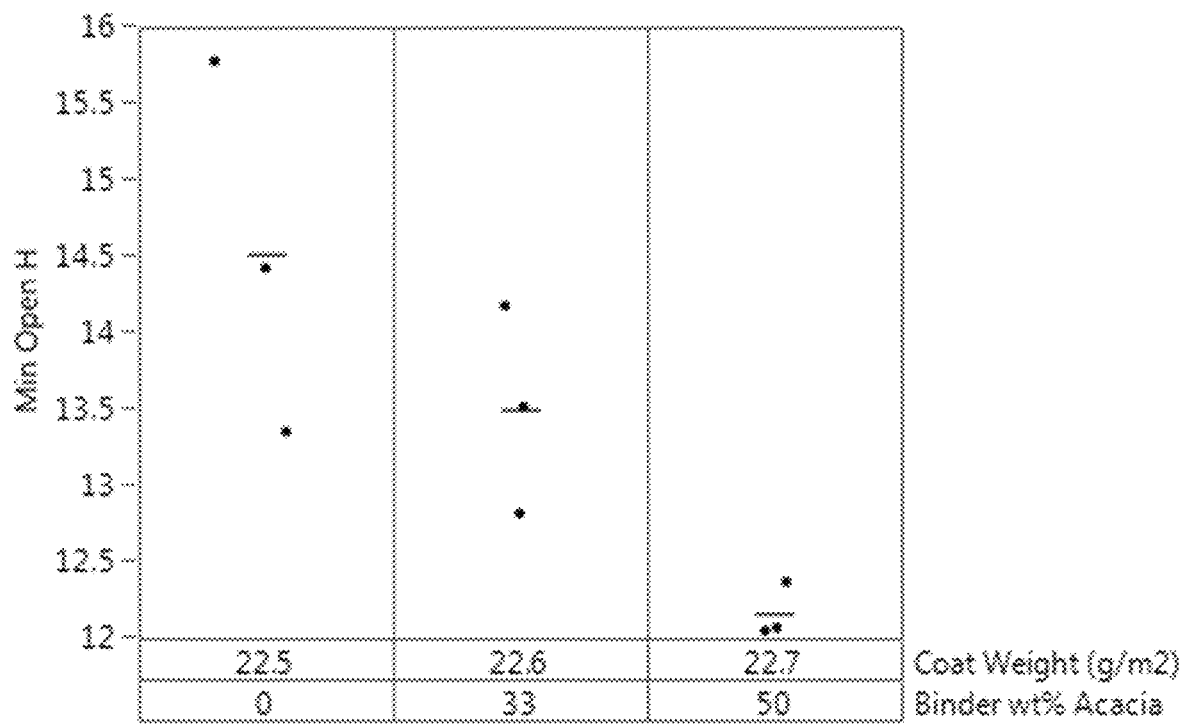
FIG. 13A shows haze measurements for variable transmission samples for a variety of fish gelatin binder compositions. The left panel samples contained binder with no acacia, the middle panel samples contained binder with 33% (wt./wt.) of acacia; and the right panel samples contained binder that was equal parts fish gelatin and acacia.
Figure 13B:
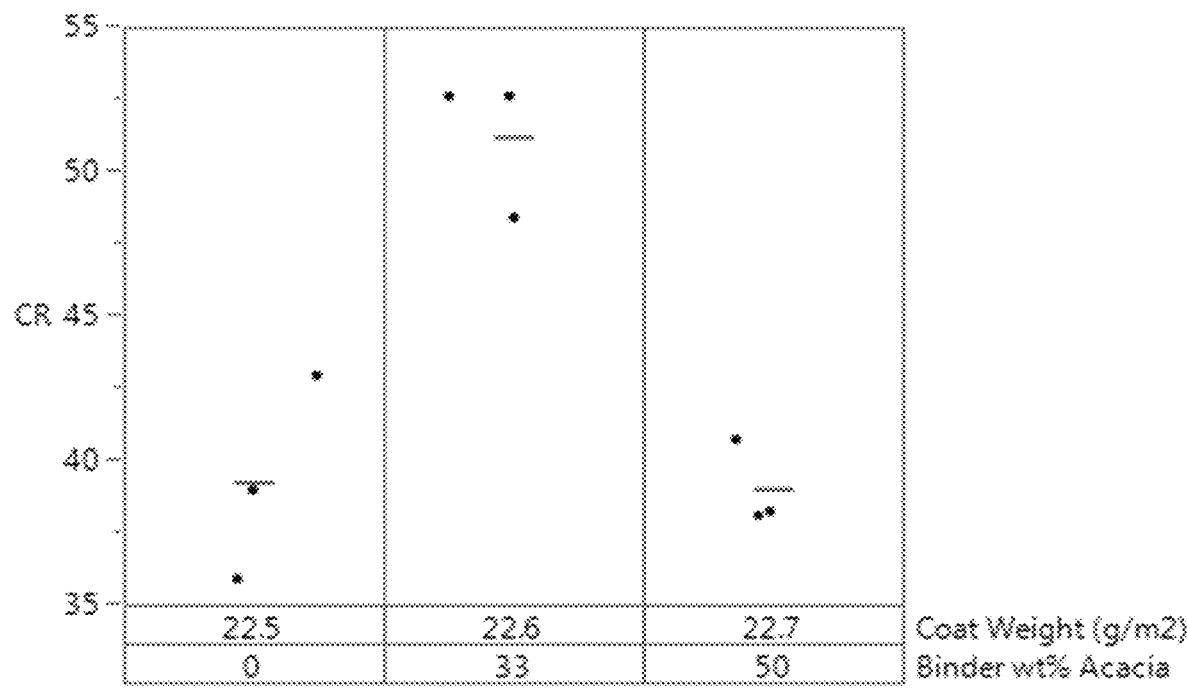
FIG. 13B shows contrast ratio measurements for variable transmission samples for a variety of fish gelatin binder compositions. The left panel samples contained binder with no acacia, the middle panel samples contained binder with 33% (wt./wt.) of acacia; and the right panel samples contained binder that was equal parts fish gelatin and acacia.
Figure 13C:
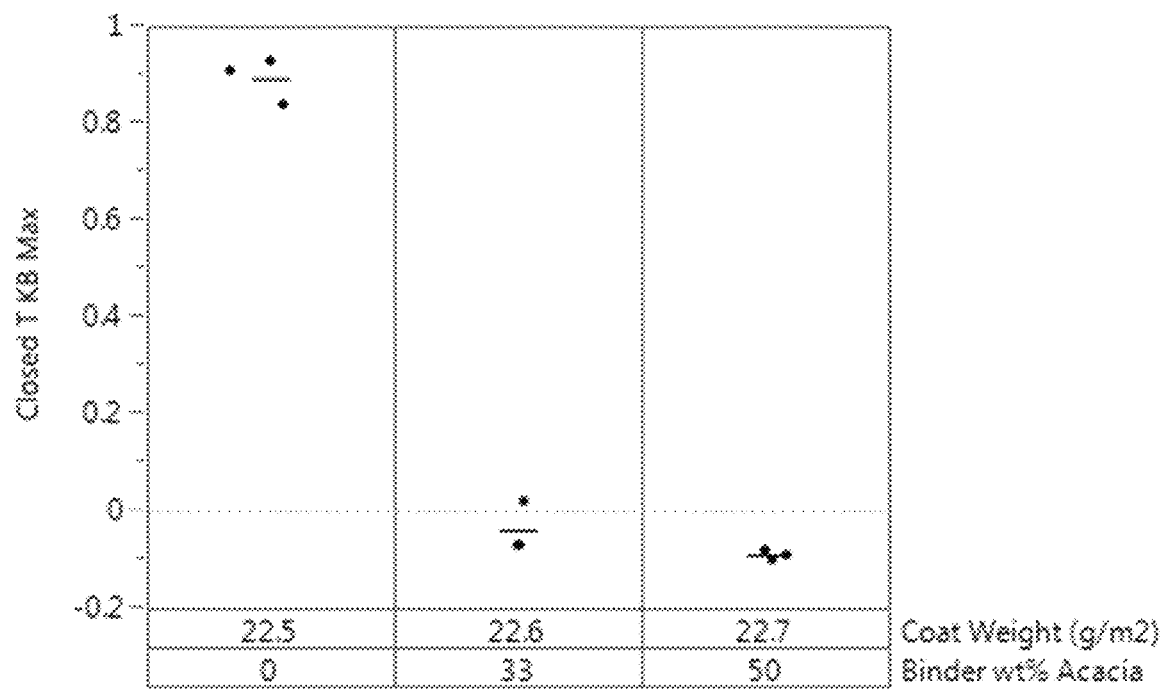
FIG. 13C shows kickback measurements for variable transmission samples for a variety of fish gelatin binder compositions. The left panel samples contained binder with no acacia, the middle panel samples contained binder with 33% (wt./wt.) of acacia; and the right panel samples contained binder that was equal parts fish gelatin and acacia.
Figure 14:
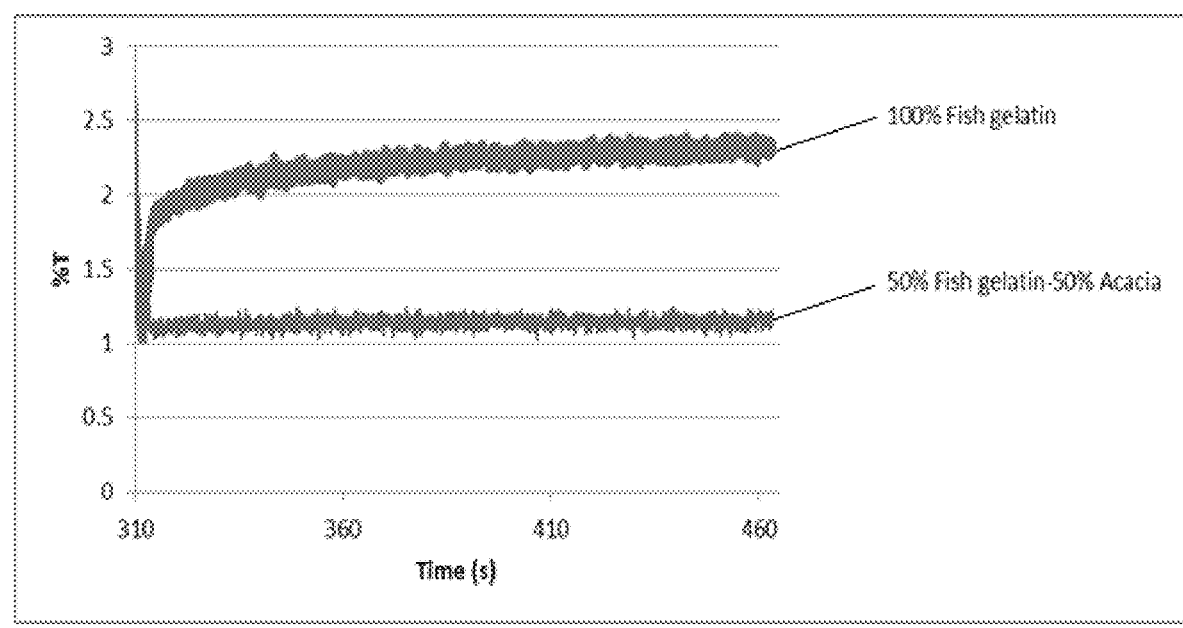
FIG. 14 shows the decay of the closed state for samples having only fish gelatin as a binder compared to samples having equal parts fish gelatin and acacia. In tests, the 1:1 mixture of fish gelatin and acacia had substantially less kickback, resulting in open and closed states that were stable for weeks.

Several samples of variable transmission test films were prepared for each binder formulation. The samples were then evaluated for open and closed transmission as well as haze using the optical evaluation setup described in U.S. Pat. No. 7,679,814. In brief, each sample was placed in front of a calibrated light source with an integrating detector on the opposite side of the sample. Each sample was driven to the open and closed state and evaluated for transmission. Additionally, a calibrated chopping wheel was used to measure the diffuse versus the transmitted light to evaluate haze. The amount of kickback was also evaluated by comparing the decay in the open state as a function of time (see FIG. 14). The resulting data is shown in FIGS. 13A-13C.

Evaluating the difference between the three binder formulations, it is clear that the 1:1 mixture of fish gelatin and acacia produced an electro-optic medium with good contrast (difference between open and closed states; FIG. 13B) and very low haze (FIG. 13A). Additionally, both binder mixtures containing acacia had little kickback, leading to very long stability in the open and closed state. See FIG. 14.

IV. Variable Transmission Medium Incorporating Capsules

Example 1

A nonaqueous internal phase was prepared by combining OLOA® 11000, 1-limonene, Cargille® 5040 immersion fluid, carbon black, polystyrene, and 2-hexyldecanoic acid. The internal phase mixture was then encapsulated by adding the mixture to an aqueous gelatin/acacia solution, emulsifying the mixture, and adding a dispersion of 10 wt % Emperor 2000 carbon black with 5 wt % Kolliphor P188.

After mixing, heating, and pH adjustment, the resulting capsules were cooled and sorted into two size distributions, one ranging in size from about 20 μm to about 50 μm with a mean size of about 35 μm, and another ranging in size from about 50 μm to about 90 μm, with a mean size of about 60 μm. For some of the experiments detailed below, three parts by weight of the second portion were combined with one part by weight of the first portion.

The resulting capsule slurries were centrifuged and then mixed with an aqueous binder of 50:50 fish gelatin (Norland HiPure Liquid Gelatin):Acacia (AEP colloids) at a ratio of 1 part by weight binder to 7 parts by weight of capsules, and a solution of colorant 10 wt % Emperor 2000 carbon black with 5 wt % Kolliphor P188 in water with a ratio of 1 part carbon black colorant to 49 parts binder. The resultant mixture was bar coated on to a 125 mm thick indium-tin oxide coated polyester film. The coated film was allowed to oven dry to produce an electrophoretic medium approximately 25 μm thick containing essentially a single layer of capsules.

The capsule-coated surfaces of the coated films were then overcoated with a urethane acrylate based adhesive. As the adhesive layer was added, a screen-printed sheet of 125 mm thick indium-tin oxide coated polyester film was applied. The resulting assemblies were then cured by exposure to UV light from a CSun UV lamp.

Two sets of samples were prepared. A first set of samples ("small only" in FIGS. 16A-16D) was prepared by using only the about 20 μm to about 50 μm capsules. A second set of samples ("mixed" in FIGS. 16A-16D) was prepared by mixing three weight parts of the about 50 μm to about 90 μm capsules with one weight part of the 20 μm to about 50 μm capsules.

Figure 17:
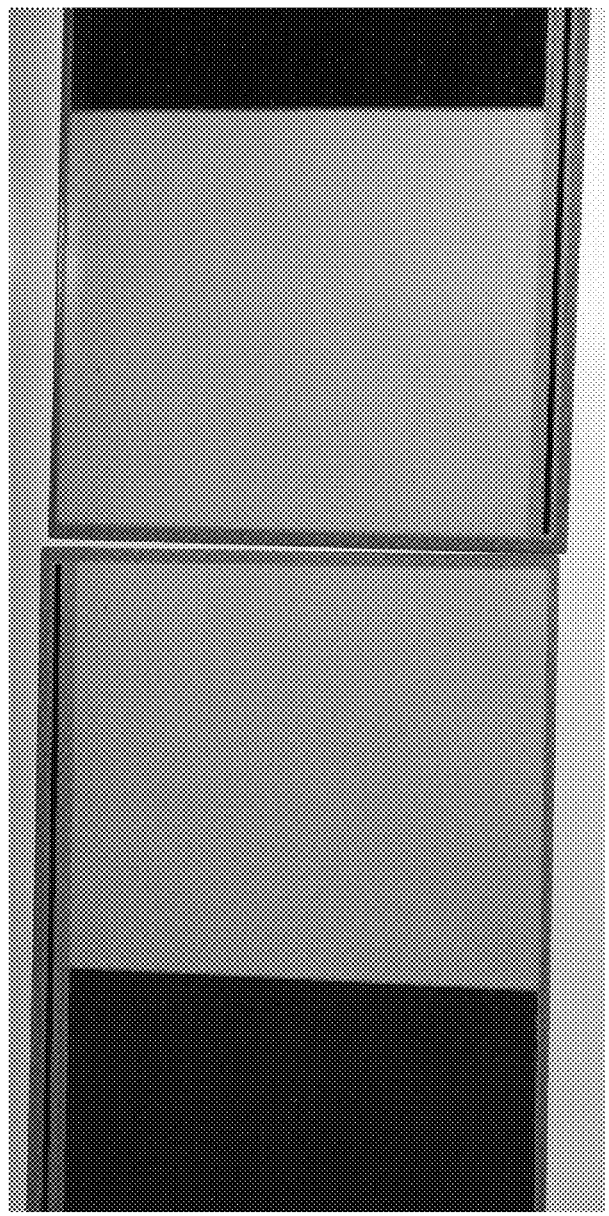
FIG. 17 shows images of variable transmission devices including only small capsules (left) and a blend of large and small capsules (right).
Figure 18:
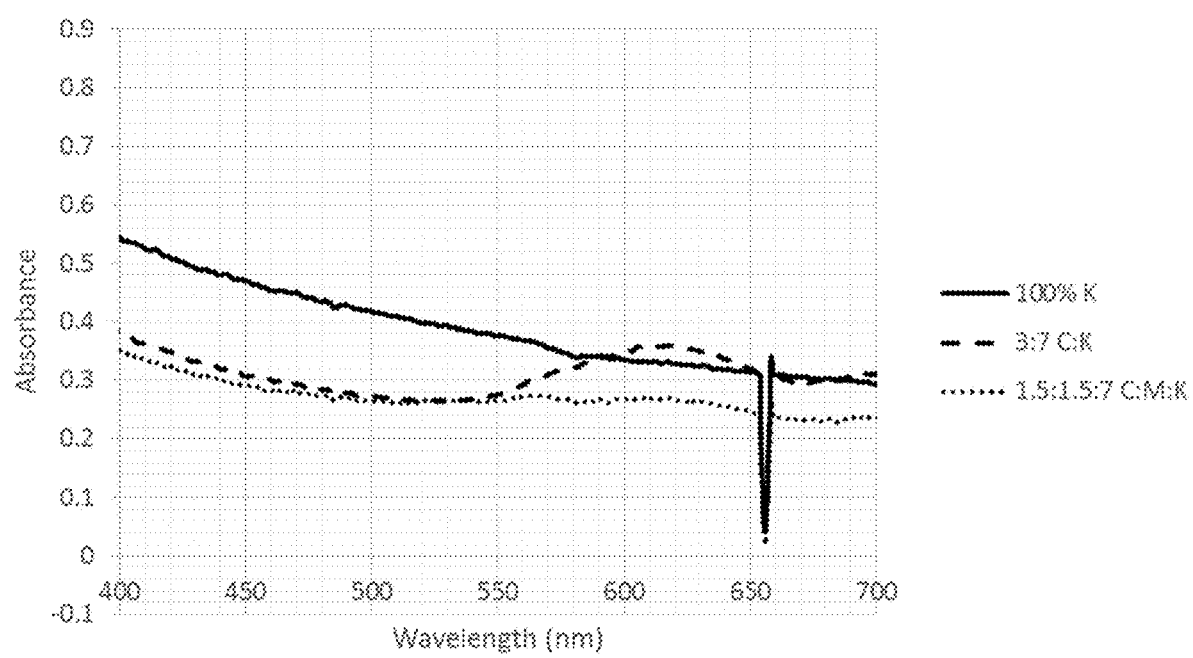
FIG. 18 shows visible absorption spectra for various binder-pigment formulations.

The samples were then evaluated for open and closed transmission as well as haze using the optical evaluation setup described in U.S. Pat. No. 7,679,814. In brief, each sample was placed in front of a calibrated light source with an integrating detector on the opposite side of the sample. Each sample was driven to the open and closed state and evaluated for transmission. Additionally, a calibrated chopping wheel was used to measure the diffuse versus the transmitted light to evaluate haze. The resulting data is shown in FIGS. 16A-16D. FIG. 17 shows side-by-side images of samples of small only and mixed capsule samples in the open state. As can be seen in FIG. 17, there is little to no change in grain between the small only and mixed capsule formulations.

Evaluating the difference between the small only sample and the mixed, it is clear that the mixture of both large and small capsules produced an electro-optic medium with superior contrast (difference between open and closed states) as well as lower haze. Substantially less haloing (interference patterns) was also observed in the mixed sample as compared to the small only.

Example 2

Capsules were prepared similar to the procedure in Example 1 above except that capsules were sieved into three categories of sizes and two blends. The blends included a small group having a size distribution of about 5 μm to about 50 μm with a mean number diameter of about 20 μm, a medium group having a size distribution of about 20 μm to about 90 μm with a mean number diameter of about 35 μm, and a large group having a size distribution of about 20 μm to about 90 μm with a mean number diameter of about 40 μm. The two blends included a medium blend with a weight ratio of medium size capsules to small size capsules of 2:1, resulting in a mean number diameter of about 25 μm, and a large blend with a weight ratio of large size capsules to small size capsules of 7:1, resulting in a mean number diameter of about 30 μm.

The electro-optic properties of the small, medium, large, medium blend, and large blend capsules were tested to determine the appearance of grain, haze, and transmission. The results are provided in FIGS. 26A to 26L. From the results it is apparent that the inclusion of small capsules reduces grain in the closed state, while the large capsules are better at reducing grain in the open state and reducing haze. Therefore, the data shows that the electro-optic properties may be tunable depending on which properties are most important for a particular application.

V. Variable Transmission Film Containing Tinted Adhesive

Sample 1: A non-aqueous internal phase was prepared by combining OLOA® 11000, 1-limonene, Cargille® 5040 immersion fluid, carbon black, polystyrene, and 2-hexyldecanoic acid. The resultant mixture was encapsulated by adding the mixture to an aqueous gelatin/acacia solution, emulsifying the mixture, and adding a dispersion of 10 weight percent Emperor 2000 carbon black with 5 weight percent Kolliphor P 188. After mixing, heating, and pH adjustment, the resulting capsules were cooled and sieved to a range of 20-60 μm, with a mean size of 30-40 μm.

The resulting capsules were centrifuged and then mixed with an aqueous binder of 50:50 fish gelatin (Norland HiPure Liquid Gelatin):acacia at a ratio of 1 part by weight binder to 7 parts by weight of capsules, and an aqueous colorant dispersion comprising 10 weight percent Emperor 2000 carbon black with 5 weight percent Kolliphor P188 at a ratio of 1 part colorant dispersion to 54 parts binder. The resultant mixture was bar coated on to a 125 μm thick indium-tin oxide coated polyester film (the capsules being deposited on the ITO-coated face), and the coated film was oven dried to produce an electrophoretic medium approximately 27 μm thick containing essentially a single layer of capsules.

The exposed surface of the electrophoretic medium was then overcoated with a radiation-curable urethane acrylate based adhesive composition. As the adhesive layer was applied, a screen-printed sheet of 125 μm thick indium-tin oxide coated polyester film was applied. The resulting assemblies were then cured by exposure to ultraviolet light.

Sample 2: The same procedure was followed as in Sample 1, but the UV-curable adhesive also contained 0.5 phr Keyplast Black AN. A cured 1 mil cell with the tinted adhesive blend had 21.5% transmission and 0.7% haze. Electro-optic performance of Sample 1 and Sample 2 are provided in Table 2.

TABLE 2

EO performance of electrophoretic media with and without tinted adhesive.

| Sample | Adhesive | OS T % | CS T % | OS H % | OS cqi (grain) total | CS cqi (grain) total | Pinhole total |
|---|---|---|---|---|---|---|---|
| 1 | Clear | 44.6 | 0.9 | 9.2 | 126 | 146 | 60 |
| 2 | Tinted | 34.1 | 0.9 | 9.2 | 87 | 155 | 41 |

Figure 24A:
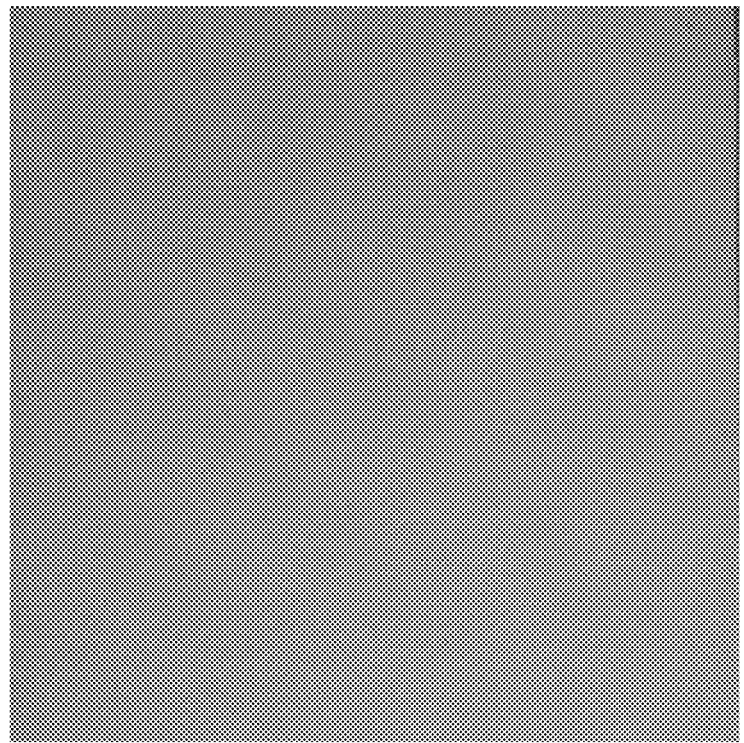
FIG. 24A is a photograph of a variable transmission assembly in an open state comprising a clear adhesive layer.
Figure 24B:
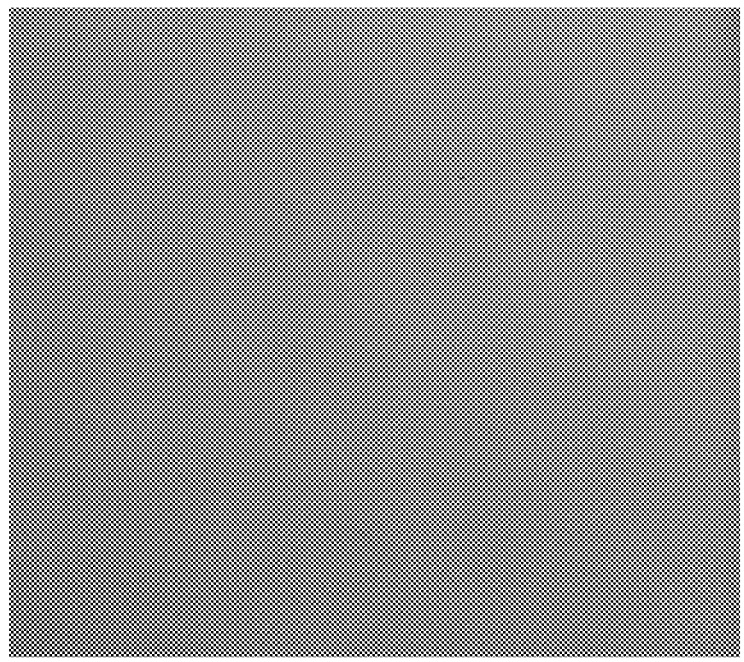
FIG. 24B is a photograph of a variable transmission assembly in an open state comprising a tinted adhesive layer according to an embodiment of the present invention.
Figure 25A:
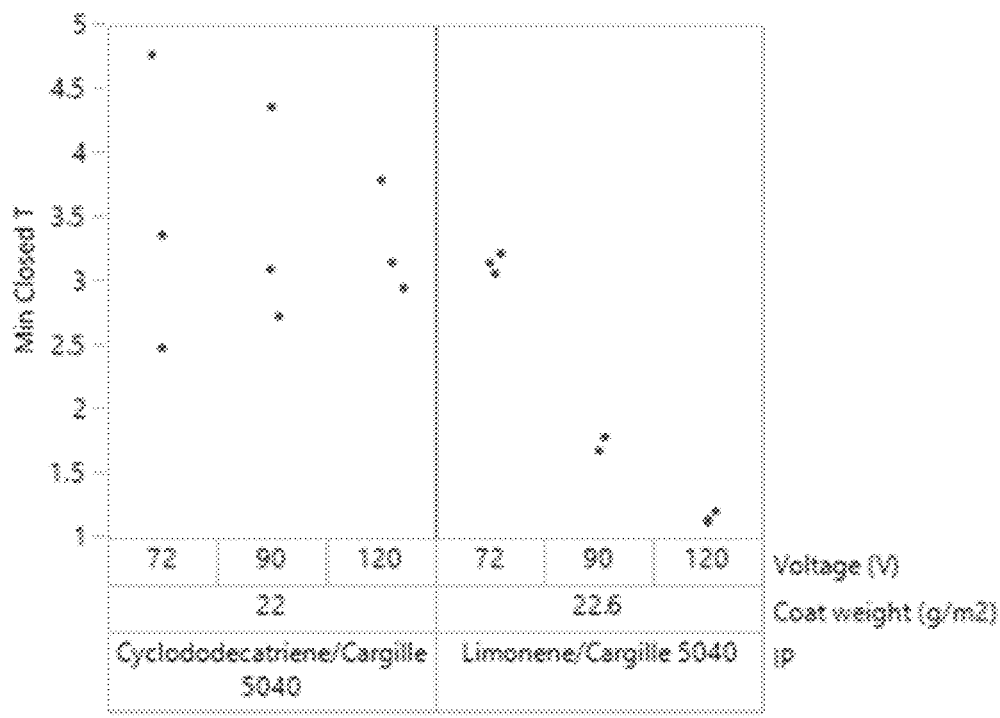
FIGS. 25A to 25D are graphs showing respectively the minimum closed state transmission, the minimum open state transmission, the contrast ratio, and the minimum open state haze for encapsulated electrophoretic media according to various embodiments of the present invention.
Figure 25B:
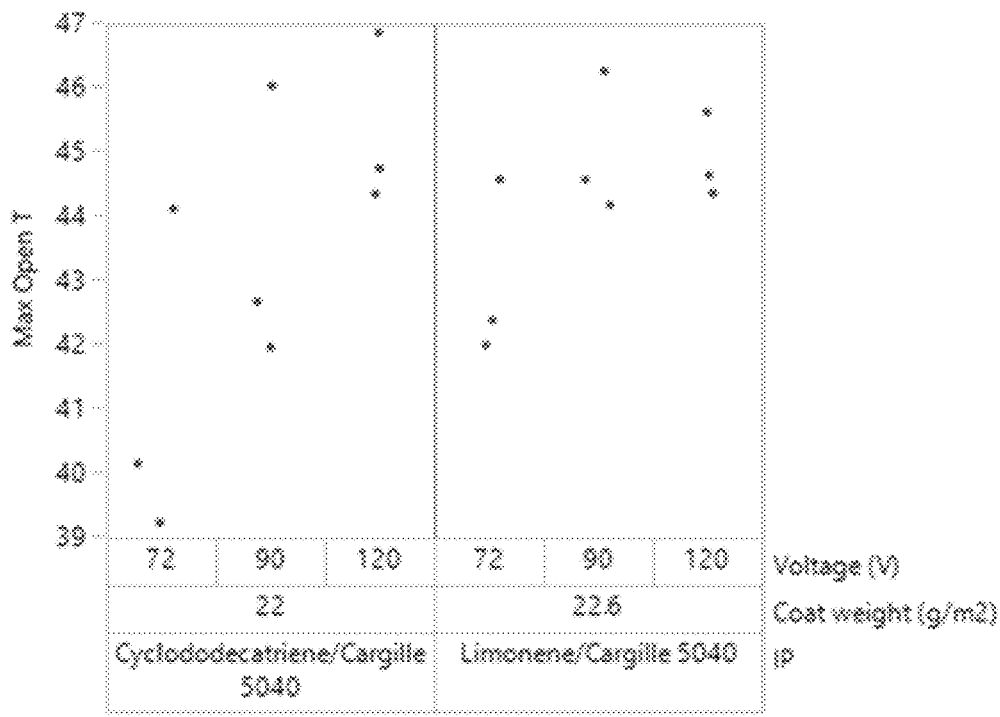
Figure 25C:
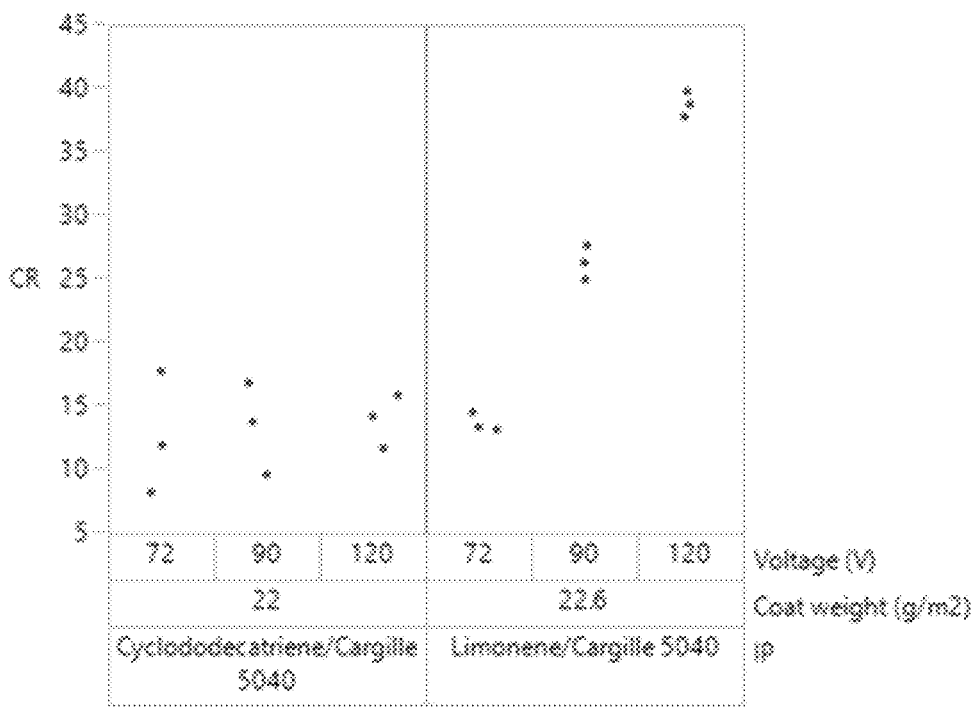
Figure 25D:
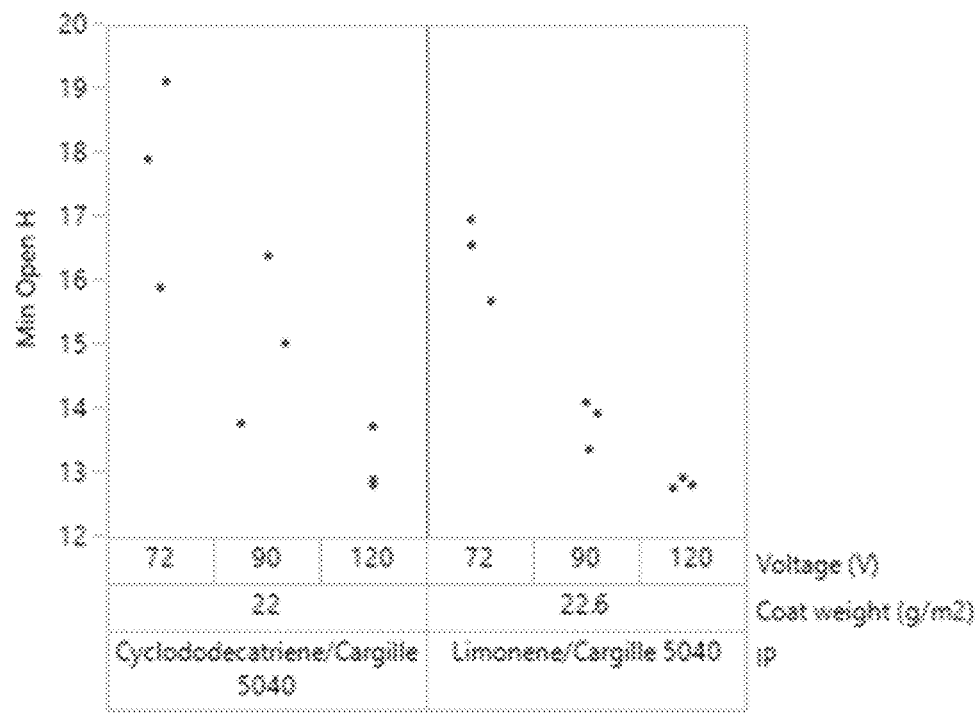
Figure 26A:
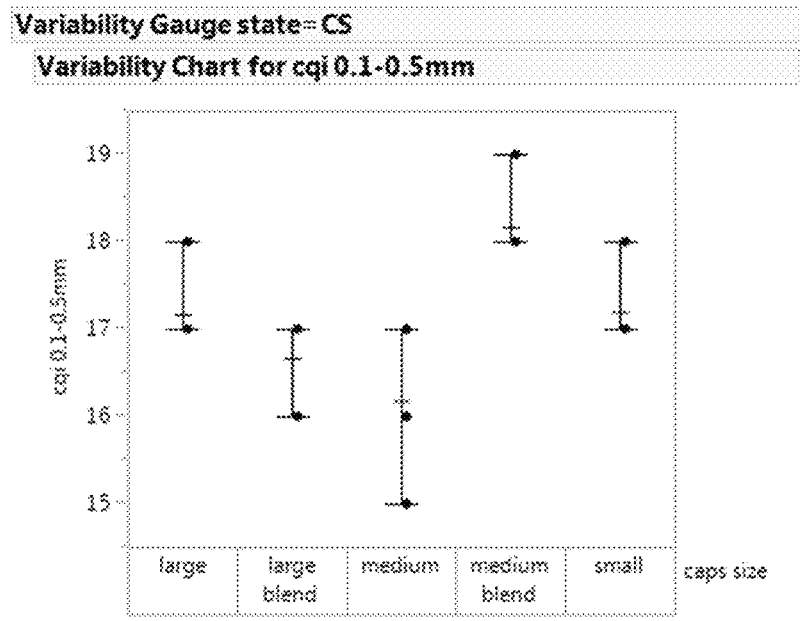
FIGS. 26A to 26L are graphs showing the minimum closed state transmission, the minimum open state transmission, the contrast ratio, and the minimum open state haze for encapsulated electrophoretic media containing various sized capsules according to various embodiments of the present invention.
Figure 26B:
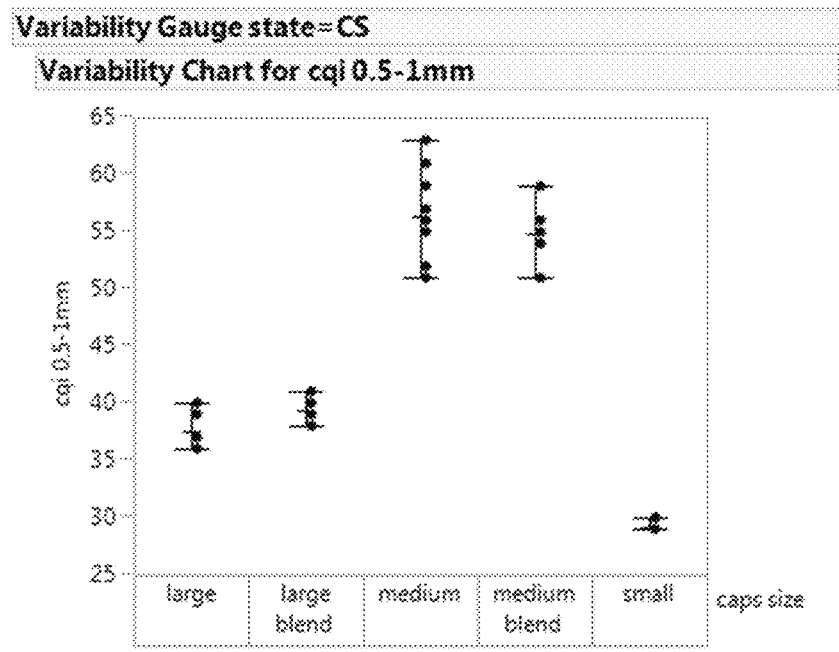
Figure 26C:
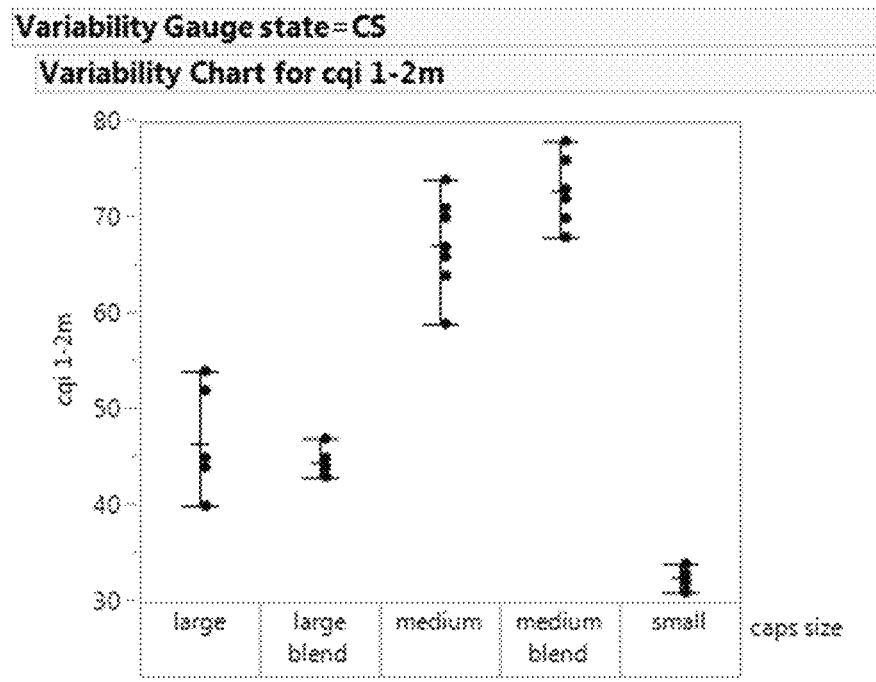
Figure 26D:
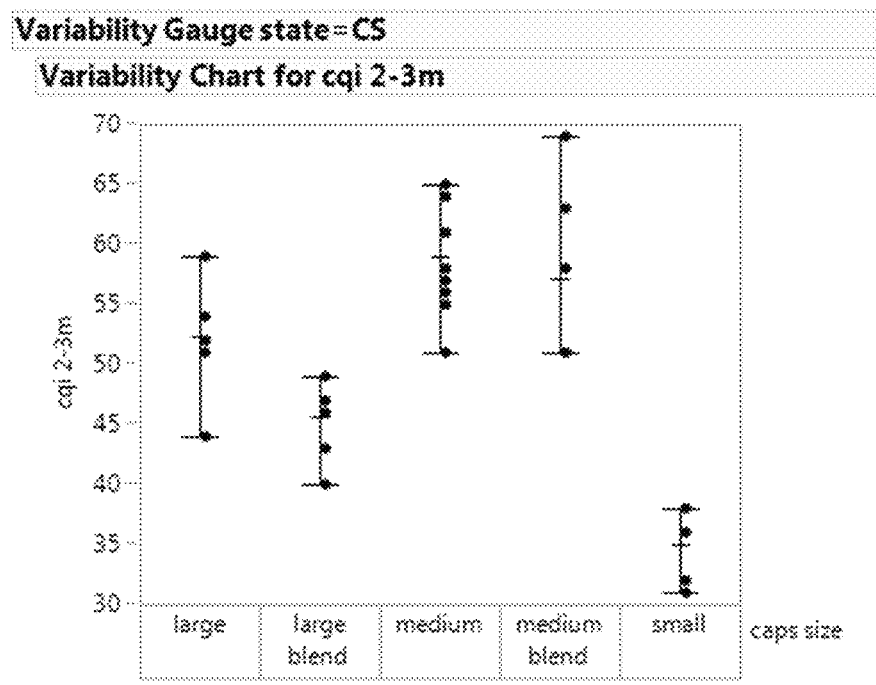
Figure 26E:
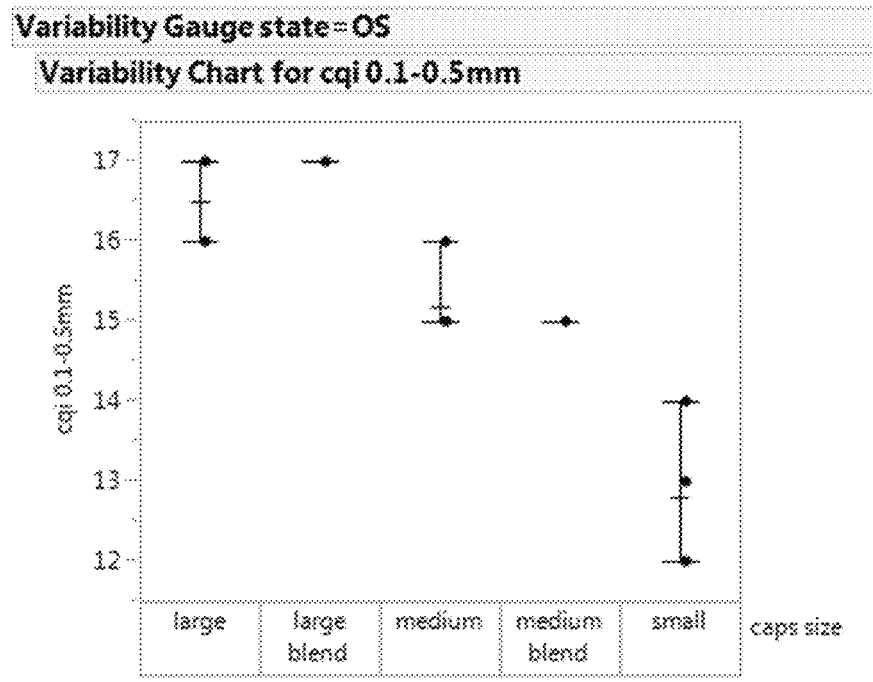
Figure 26F:
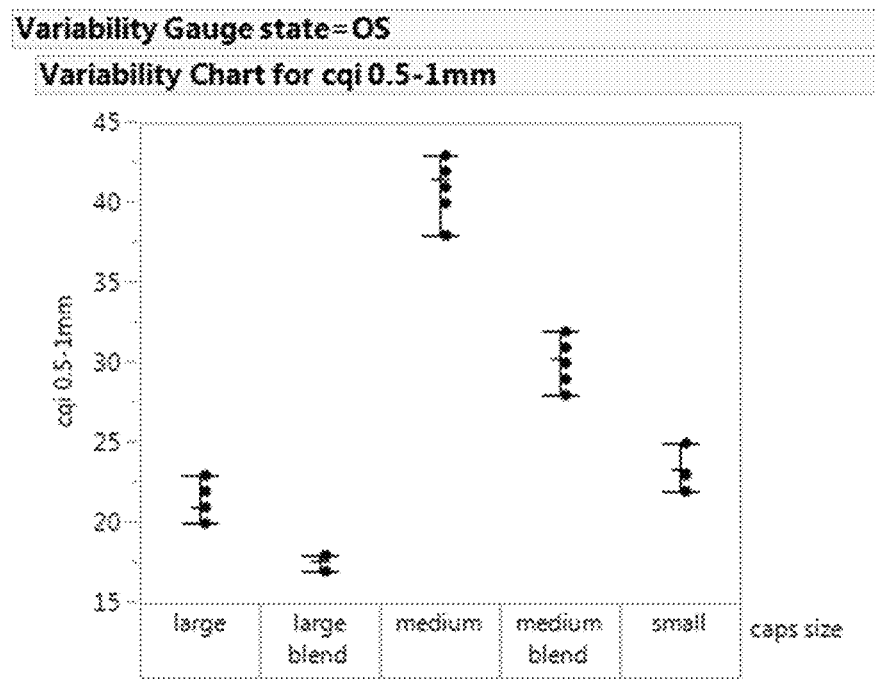
Figure 26G:
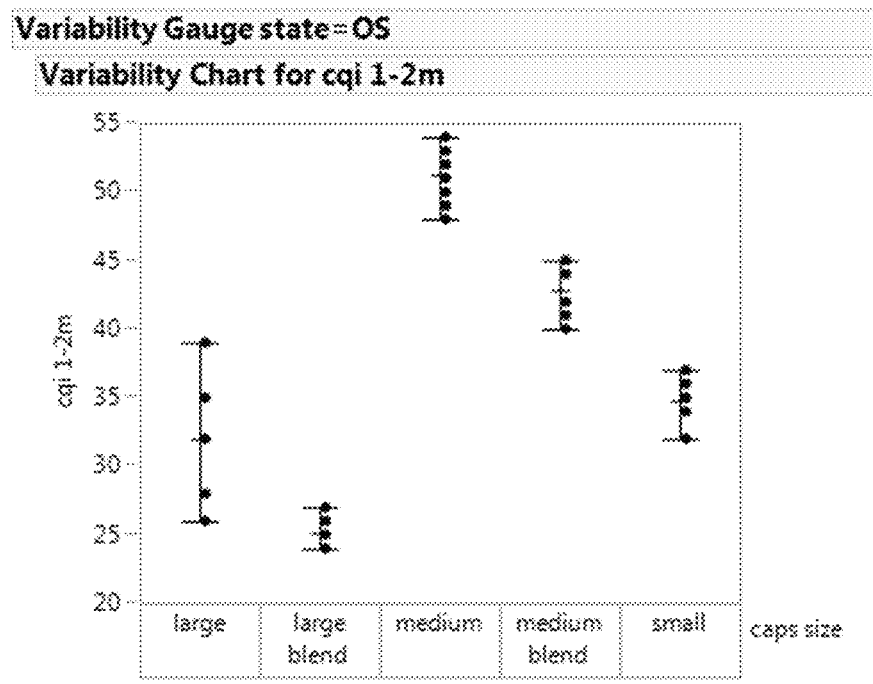
Figure 26H:
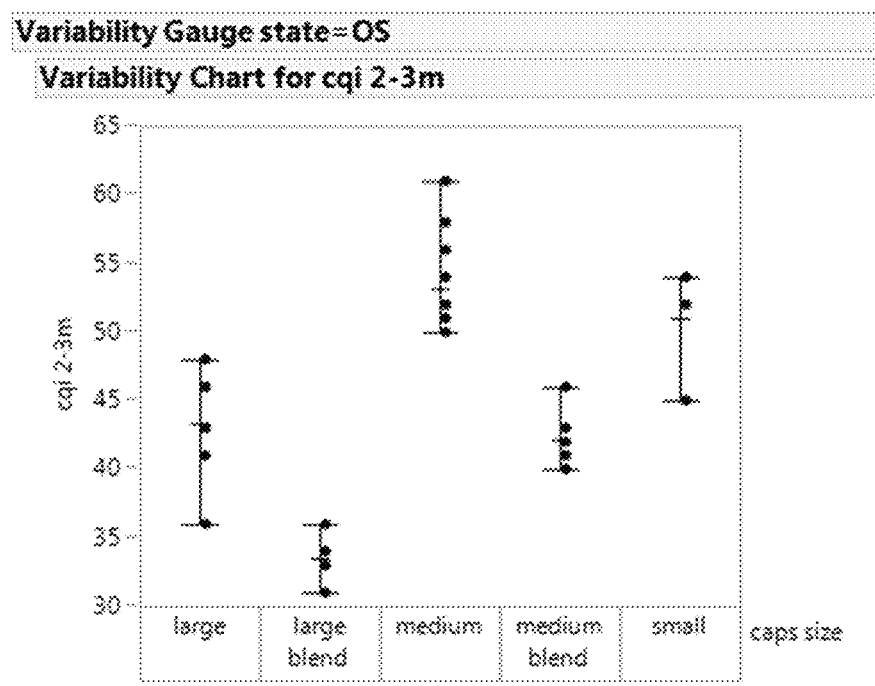
Figure 26I:
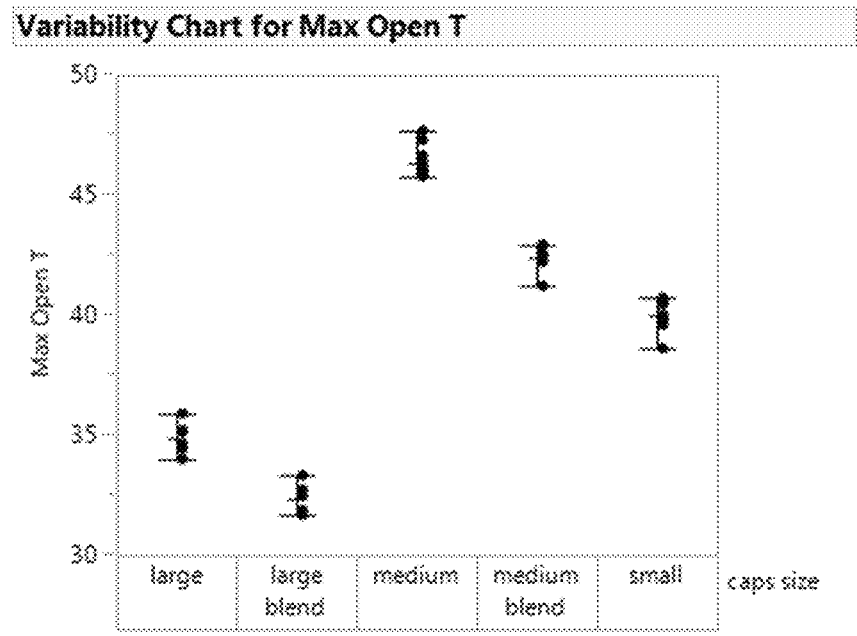
Figure 26J:
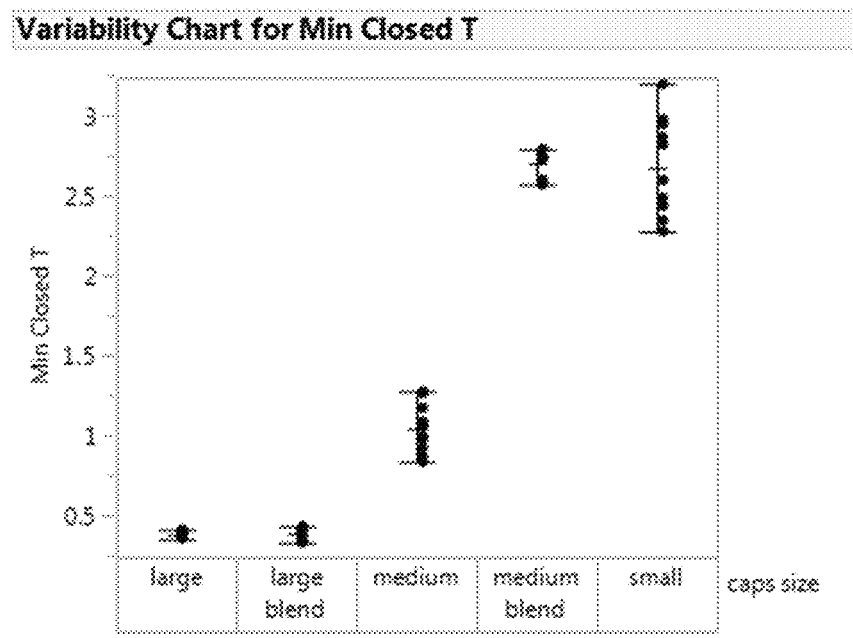
Figure 26K:
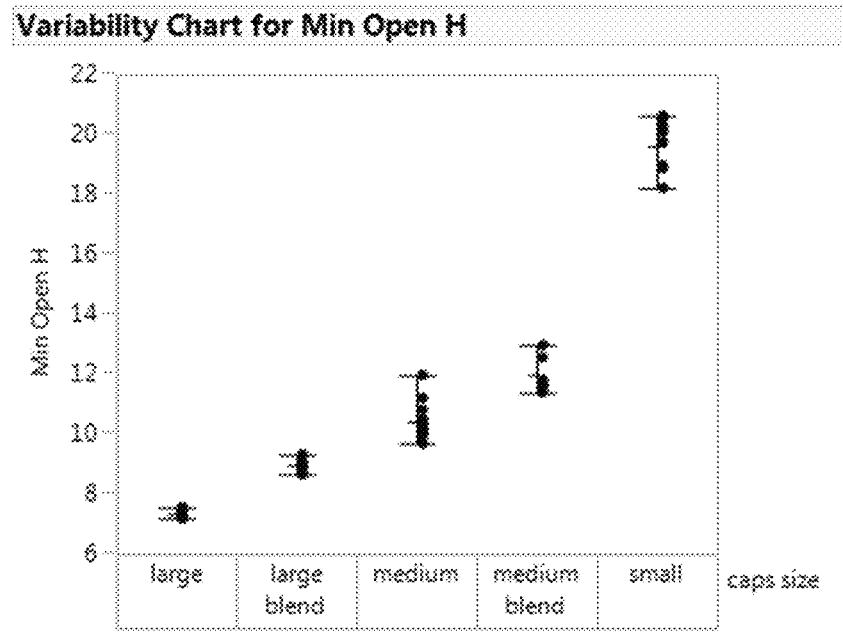
Figure 26L:
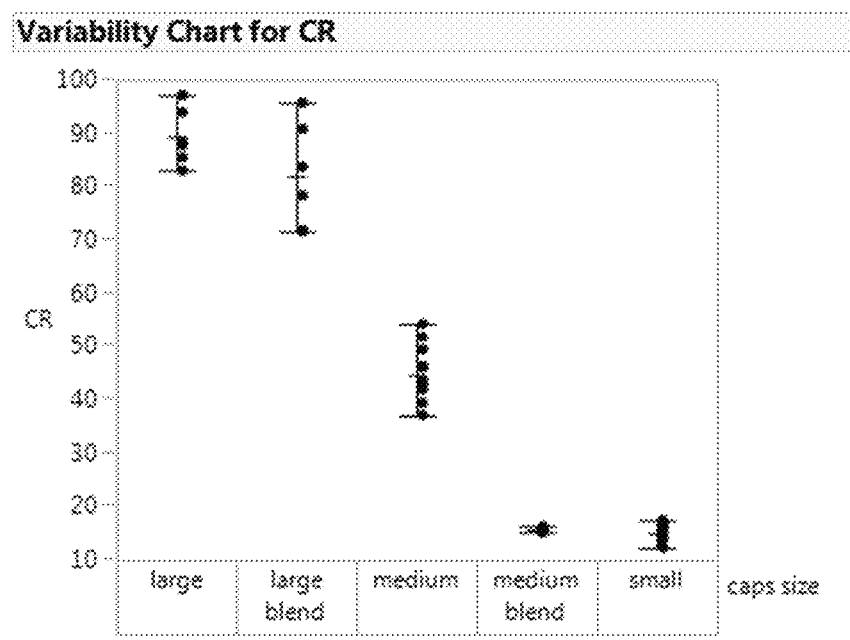

Based on the compared results of Sample 1 and Sample 2, the variable transmission film containing the tinted UV-curable adhesive provided less grain and reduced pinholes, and using a dye that is soluble in the adhesive did not increase the haze. A photograph of Sample 1 in the open state is provided in FIG. 24A and a photograph of Sample 2 in the open state is provided in FIG. 24B.

VI. Variable Transmission Film Containing Encapsulated Nonconjugated Olefinic Hydrocarbon Example 1

A non-aqueous internal phase was prepared by combining OLOA® 11000, Cargille® 5040 immersion fluid, trans, trans,cis-1,5,9-cyclododecatriene (CDT), carbon black, polystyrene, and 2-hexyldecanoic acid. The resultant mixture was then encapsulated by adding the mixture to an aqueous gelatin/acacia solution, emulsifying the mixture, and adding a dispersion of 10 weight percent Emperor 2000 carbon black with 5 weight percent Kolliphor P 188. After mixing, heating, and pH adjustment, the resulting capsules were cooled and sieved to a range of 20-60 μm, with a mean size of 30-40 μm.

The resulting capsules were centrifuged and then mixed with an aqueous binder of fish gelatin (Norland HiPure Liquid Gelatin) at a ratio of 1 part by weight binder to 7 parts by weight of capsules, and an aqueous colorant dispersion comprising 10 weight percent Emperor 2000 carbon black with 5 weight percent Kolliphor P188 at a ratio of 1 part colorant dispersion to 49 parts binder. The resultant mixture was bar coated on to a 125 μm thick indium-tin oxide coated polyester film (the capsules being deposited on the ITO-coated face), and the coated film was dried to produce an electrophoretic medium approximately 22 μm thick containing essentially a single layer of capsules.

The exposed surface of the electrophoretic medium was then overcoated with a radiation-curable urethane acrylate based adhesive. As the adhesive layer was applied, a screen-printed sheet of 125 mm thick indium-tin oxide coated polyester film was applied. The resulting assemblies were then cured by exposure to ultraviolet light.

Example 2

A comparative assembly was prepared containing encapsulated 1-limonene and Cargille® 5040 according to the procedure provided in Part III of the Examples above. The electro-optic performance of the assemblies of Example 1 and Example 2 are provided in FIGS. 25A to 25D.

As indicated above, the present invention provides improved variable transmission electrophoretic media which is well adapted for use in variable transmission windows and vehicle sunroofs, for example. The media of the present invention may be readily produced using conventional processes and may allow for easier deposition on to glass or other rigid substrates than slot die coating.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A variable transmission film comprising:
   a layer of an electrophoretic medium comprising a plurality of capsules and a binder, each capsule containing a plurality of electrically charged particles and a fluid, the charged particles being movable by application of an electric field and capable of being switched between an open state and a closed state;

a layer of adhesive comprising a tinting agent; and two light-transmissive electrodes, wherein the layer of electrophoretic medium and the layer of adhesive are disposed between the two light-transmissive electrodes, wherein the tinting agent comprises one or more types of colored pigment particles selected from the group consisting of black, cyan, yellow, and magenta particles, and combinations thereof, wherein the tinting agent comprises a mass ratio of black to cyan particles of 10:1 to 3:2, and a mass ratio of black to magenta particles of 10:1 to 3:2.

2. The variable transmission film of claim 1, wherein the tinting agent is selected from the group consisting of a dye and a pigment.

3. The variable transmission film of claim 1, wherein the tinting agent comprises a soluble dye.

4. The variable transmission film of claim 1, wherein the tinting agent comprises carbon black.

5. The variable transmission film of claim 1, wherein the black, cyan, and magenta particles have an average diameter within a range of 20 and 100 nm.

6. The variable transmission film of claim 1, wherein the layer of adhesive has a transmission greater than the transmission of the layer of electrophoretic medium in the closed state and less than the transmission of the layer of electrophoretic medium in the open state.

7. A variable transmission film, comprising:

an electrophoretic medium layer comprising a plurality of capsules and a binder, each capsule containing a plurality of electrically charged particles and a fluid, the charged particles being movable in the capsules by application of an electric field and capable of being switched between an open state and a closed state;

a tinted adhesive blend layer comprising an adhesive uniformly blended with a tinting agent and configured to reduce grain and pinholes in the electrophoretic medium layer; and two light-transmissive electrodes, wherein the electrophoretic medium layer and the tinted adhesive blend layer are disposed between the two light-transmissive electrodes, wherein the tinting agent comprises one or more types of colored pigment particles selected from the group consisting of black, cyan, yellow, and magenta particles, and combinations thereof; and wherein the tinting agent comprises a mass ratio of black to cyan particles of 10:1 to 3:2, and a mass ratio of black to magenta particles of 10:1 to 3:2.

8. The variable transmission film of claim 7, wherein the tinting agent is selected from the group consisting of a dye and a pigment.

9. The variable transmission film of claim 7, wherein the tinting agent comprises a soluble dye.

10. The variable transmission film of claim 7, wherein the tinting agent comprises carbon black.

11. The variable transmission film of claim 7, wherein the black, cyan, and magenta particles have an average diameter within a range of 20 and 100 nm.

12. The variable transmission film of claim 7, wherein the tinted adhesive blend layer has a transmission greater than the transmission of the electrophoretic medium layer in the closed state and less than the transmission of the electrophoretic medium layer in the open state.

* * * * *